US008959052B2

(12) United States Patent
Akiyama

(10) Patent No.: US 8,959,052 B2
(45) Date of Patent: Feb. 17, 2015

(54) DATABASE UPDATE CONTROL APPARATUS, DATABASE MANAGEMENT SYSTEM, AND NON-TRANSITORY COMPUTER-READABLE STORAGE MEDIUM

(75) Inventor: Takashi Akiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 60 days.

(21) Appl. No.: 13/494,051

(22) Filed: Jun. 12, 2012

(65) Prior Publication Data
US 2013/0036090 A1 Feb. 7, 2013

(30) Foreign Application Priority Data

Aug. 4, 2011 (JP) ................................. 2011-171380

(51) Int. Cl.
G06F 17/30 (2006.01)
(52) U.S. Cl.
CPC ............................ G06F 17/30578 (2013.01)
USPC .......................................... 707/624; 707/662
(58) Field of Classification Search
USPC ........................................................ 707/662
See application file for complete search history.

(56) References Cited

U.S. PATENT DOCUMENTS 7,194,486 B2  3/2007 Ishikawa et al.
7,567,989 B2  7/2009 Yatabe et al.
2006/0004877 A1* 1/2006 Ishikawa et al. ............... 707/200
2006/0074847 A1* 4/2006 Yatabe et al. ...................... 707/1
2007/0118705 A1   5/2007 Arakawa et al.
2007/0180075 A1* 8/2007 Chasman et al. ............. 709/223
2008/0027830 A1* 1/2008 Johnson et al. ................. 705/27

FOREIGN PATENT DOCUMENTS

JP  2006-018796    1/2006
JP  2006-23889 A   1/2006
JP  2006-092005    4/2006
JP  2007-317040    12/2007

OTHER PUBLICATIONS

Japanese Office Action mailed Dec. 2, 2014 for corresponding Japanese Patent Application No. 2011-171380, with Partial English Translation, 4 pages.

(Continued)

Primary Examiner — Belix M Ortiz Ditren
(74) Attorney, Agent, or Firm — Fujitsu Patent Center

(57) ABSTRACT

When update information with respect to a first database or a second database is received, a database update control apparatus updates the first database or the second database on the basis of the update information. When updating the first database or the second database, the database update control apparatus associates pre-update data with an identifier that is added to the update information and retains them for each database. The database update control apparatus extracts, for each database from among the retained identifiers, an identifier that indicates the latest update information and specifies, from the extracted identifiers, an identifier that is the oldest updated identifier. The database update control apparatus reflects pre-update data associated with an identifier that is newer than that specified in a corresponding database out of the first database and the second database.

6 Claims, 16 Drawing Sheets

(56) References Cited

OTHER PUBLICATIONS

Sasaki, Masashi, "Mechanism and application of replication, which facilitates establishment of distributed databases", Nikkei Computer, Japan, Nikkei Business Publications, Inc., Jul. 10, 1995, vol. 369, pp. 127-131, with Partial English Translation.

* cited by examiner

FIG.3

| JOURNAL NAME | TRANSACTION CONSISTENCY INFORMATION |
|---|---|
| xxx | 1 |
| ... | ... |

FIG.4

| UPDATE DESTINATION | LOCATION | TRANSACTION CONSISTENCY INFORMATION | UPDATED DB CONTENTS |
|---|---|---|---|

FIG.6

| REPLICA DB NAME | REFLECTION COMPLETION POINT |
|---|---|
| REPLICA DB 24a | 5 |
| REPLICA DB 24b | 6 |

FIG.7

| UPDATE DESTINATION | LOCATION | TRANSACTION CONSISTENCY INFORMATION | PRE-UPDATE DB CONTENTS |
|---|---|---|---|

REFLECT (RESTORE) PRE-UPDATE LOG IN (TO) DB

NO NEED FOR REFLECTION (RESTORATION)

DATABASE UPDATE CONTROL APPARATUS, DATABASE MANAGEMENT SYSTEM, AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2011-171380, filed on Aug. 4, 2011, the entire contents of which are incorporated herein by reference.

FIELD

The embodiments discussed herein are directed to a database update control apparatus, a database management system, and a database update control program.

BACKGROUND

Conventionally, a main center, which performs tasks by using databases (DBs), replicates these databases at a remote backup center in preparation for a disaster or the like. The main center includes multiple master DBs and the backup center includes replica DBs that are associated with the master DBs. The main center synchronizes the master DBs with the replica DBs.

If master DBs retained at a main center are updated, a system that replicates the DBs and performs synchronization transfers an update difference result (hereinafter, referred to as a journal) for each master DB to the backup center in real time. The backup center reflects, in each replica DB as a single transaction, the journal received from the main center. In this way, the main center synchronizes the master DBs with the replica DBs. If a disaster occurs in the main center, tasks are resumed at the backup center.

A commonly performed task of the main center is to update multiple master DBs in a single transaction, and this transaction maintains the consistency with each master DB. As a technology for maintaining the consistency of each replica DB at a backup center, there is a known technology for accumulating journals in a temporary file and temporarily suspending the reflecting of a journal in the replica DB.

In the following, as an example, a description will be given in which a main system is used that includes a master DB (A) and a master DB (B) and a backup center is used that includes a replica DB (C), which is a replica DB of the master DB (A), and a replica DB (D), which is a replica DB of the master DB (B).

The main center transmits, to the backup center, a transaction 1, a transaction 2, a transaction 3, and a transaction 4 as a first generation journal file for the replica DB (C). Similarly, the main center transmits, to the backup center, the transaction 1 and the transaction 2 as a first generation journal file for the replica DB (D). Each transaction is a process for reflecting a journal in a DB.

The backup center specifies that the transaction 1 and the transaction 2 are contained in the journal with respect to each replica DB. Specifically, the backup center specifies that the journals of the transaction 1 and the transaction 2 are both sent to each of the replica DBs. Accordingly, the backup center executes the transaction 1 and the transaction 2 on the replica DB (C) and the replica DB (D) and the update results are reflected. Then, the backup center retains the transaction 3 and the transaction 4 as a takeover file for the replica DB (C) and suspends the reflection until the backup center receives the next generation journal.

Thereafter, the main center transmits, as a second journal file for the replica DB (C), a transaction 5 and a transaction 6 to the backup center. Similarly, the main center transmits, as a second journal file for the replica DB (D), the transaction 3 to the backup center.

Then, the backup center specifies that the journal of the transaction 3 is present in the takeover file for the replica DB (C) and that the transaction 3 for the replica DB (D) is received at the second generation. Specifically, the backup center specifies that the journal of the transaction 3 is sent to both replica DBs. Accordingly, the backup center executes the transaction 3, which is retained in the takeover file, on the replica DB (C) so that an update result is reflected therein and executes the transaction 3, which is received at the second generation, on the replica DB (D) to reflect an update result.

Then, the backup center retains, as a takeover file, the transaction 5 and the transaction 6 for the replica DB (C) received at the second generation and suspends the reflection until the next generation journal is received. Specifically, the backup center retains, as the take over files for the replica DB (C), the journals of the transaction 4, the transaction 5, and the transaction 6.

Patent Document 1: Japanese Laid-open Patent Publication No. 2007-317040

Patent Document 2: Japanese Laid-open Patent Publication No. 2006-18796

Patent Document 3: Japanese Laid-open Patent Publication No. 2006-92005

However, there is a problem in that it takes a long time to reflect data in a replica DB and it also takes a long time to resume the operation after a problem occurs.

In conventional technology, after grasping the status of transferring a journal to the backup center, the consistency of transactions is checked and then reflection is performed. Furthermore, the main center asynchronously transmits journals between generations. Accordingly, for a journal that is retained in a takeover file until the next generation journal is received, it is not possible to estimate the time at which the reflection will be executed; therefore, there may be a case in which reflection is suspended for quite a long time. As described above, it sometimes takes a long time to reflect data in a replica DB.

Furthermore, a takeover file retains therein, for each replica DB, a journal in which reflection is being suspended. Accordingly, if a problem occurs in the main system, the latest state of each master DB in the main system is specified from the journal that is being suspended. Therefore, if a problem occurs in the main system in a state in which a takeover file retains a lot of journals, it takes a long time to grasp the latest state of each master DB. Furthermore, thereafter, a journal is reflected in each replica DB such that each replica DB becomes the latest state of the master DB, and thus it takes a long time to resume the operation after a problem occurs. Furthermore, if all journals are reflected, because there may be a case in which the replica DBs are inconsistent, it takes a long time to specify, from among suspended journals, the maximum number of journals that can be reflected. As described above, it is hard to say that the time taken to resume the operation after a problem occurs is short.

SUMMARY

According to an aspect of an embodiment of the invention, a database update control apparatus includes an updating unit that updates, when update information with respect to a first database or a second database is received, the first database or the second database on the basis of the update information; a retaining unit that retains, in an associated manner for each database and when the updating unit updates the first database or the second database, pre-update data and an identifier which is added to the update information; a specifying unit that extracts, for each database from among the identifiers retained by the retaining unit, a first identifier indicating the latest update information and that specifies, from the extracted the first identifiers, a second identifier indicating the oldest update information; and a reflecting unit that reflects pre-update data associated with an identifier that is newer than the second identifier that the specifying unit specifies in a corresponding database out of the first database and the second database.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 3 is a schematic diagram illustrating an example of information stored in a consistency information management table;

FIG. 4 is a schematic diagram illustrating an example of a journal file transferred from the main center to a backup center;

FIG. 6 is a schematic diagram illustrating an example of information stored in a reflection completion point management table;

FIG. 7 is a schematic diagram illustrating an example of information stored in a pre-update log table;

DESCRIPTION OF EMBODIMENT(S)

Preferred embodiments of the present invention will be explained with reference to accompanying drawings.

The present invention is not limited to the embodiments.

[a] First Embodiment

Figure 1:
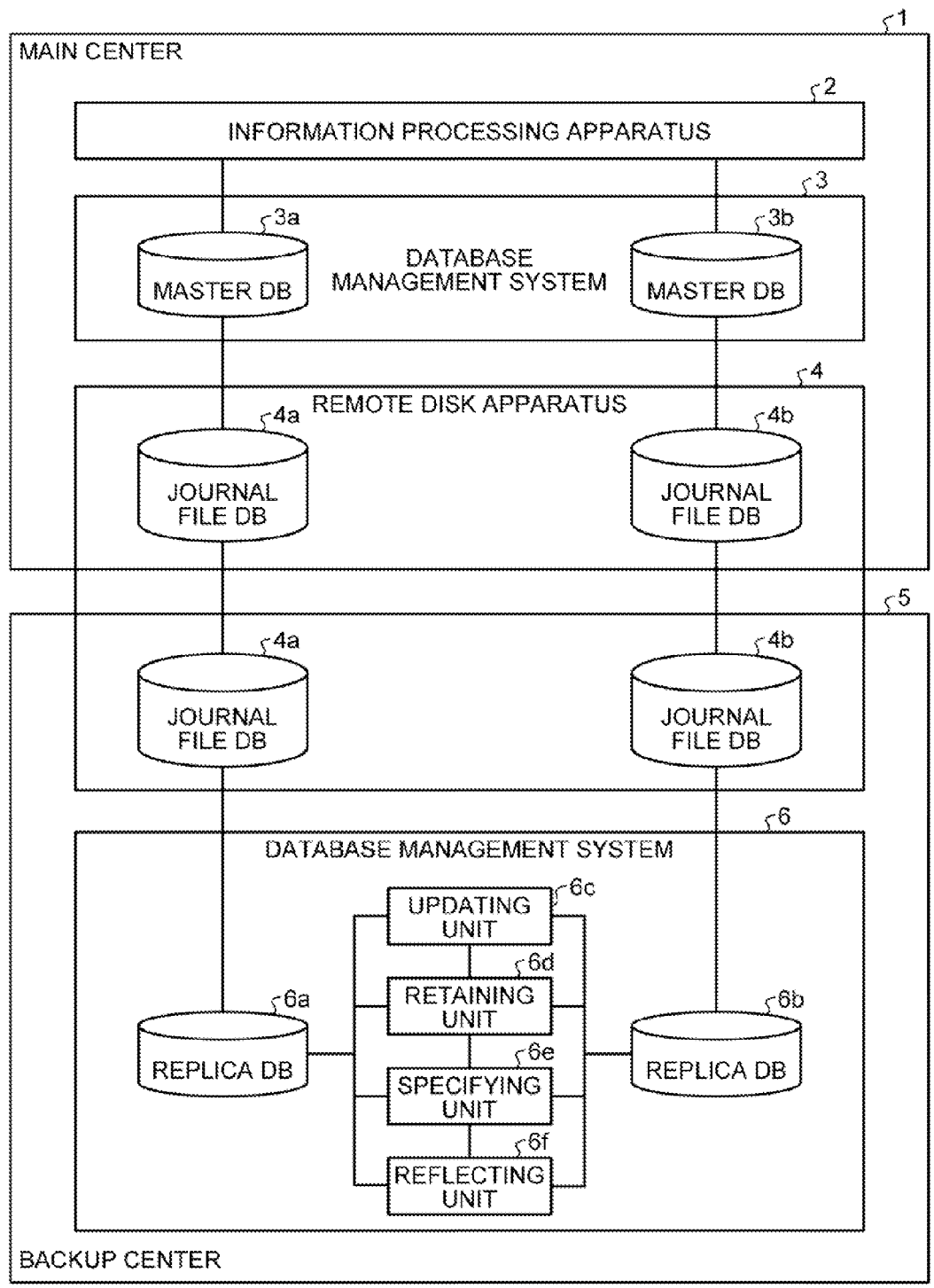
FIG. 1 is a schematic diagram illustrating an example of the overall configuration of a backup system according to a first embodiment.

FIG. 1 is a schematic diagram illustrating an example of the overall configuration of a backup system according to a first embodiment. As illustrated in FIG. 1, the backup system includes a main center 1 and a backup center 5 and is a system that replicates, to the backup center 5, a database (DB) stored at the main center 1. An example of the main center 1 or the backup center 5 includes a data center in which a server is arranged or a data center that provides a cloud system.

The main center 1 includes an information processing apparatus 2 and a database management system (DBMS) 3 and is connected to the backup center 5 via a remote disk apparatus 4. The backup center 5 includes a database management system 6 and is connected to the main center 1 via the remote disk apparatus 4.

The information processing apparatus 2 in the main center 1 is a server device that executes a task process, such as an application process. Furthermore, by using the control of a transaction provided by the database management system 3, the information processing apparatus 2 operates each master DB retained at the database management system 3.

The database management system 3 is a server device that includes a master DB 3a and a master DB 3b and that operates and manages each master DB. The database management system 3 controls a transaction and updates the master DBs at the end of transaction such that an application can use the master DBs without any inconsistency. If a master DB is updated, the database management system 3 stores a journal indicating an update difference in a journal file DB in the remote disk apparatus 4.

The remote disk apparatus 4 is an apparatus that includes a journal file DB 4a and a journal file DB 4b; that reads a journal from a journal file DB at predetermined intervals; and that transfers the journal to the backup center 5.

The database management system 6 at the backup center 5 is a server device that includes a replica DB 6a, which is a replication of the master DB 3a, and a replica DB 6b, which is a replication of the master DB 3b. The database management system 6 includes an updating unit 6c, a retaining unit 6d, a specifying unit 6e, and a reflecting unit 6f. The database management system 6 controls a transaction and updates replica DBs at the end of a transaction so that the replica DBs can be used without any inconsistency.

If a journal with respect to the replica DB 6a or the replica DB 6b is received, the updating unit 6c updates the replica DB 6a or the replica DB 6b on the basis of the journal. If the updating unit 6c updates the replica DB 6a or the replica DB 6b, the retaining unit 6d associates pre-update data with an identifier that is added to update information executed by the updating unit 6c and retains them for each replica DB. The identifier that is added to the update information is added in order to recognize the order of the update of data.

The specifying unit 6e extracts, for each replica DB from identifiers retained in the retaining unit 6d, an identifier indicating the latest update information and specifies an identifier that is the oldest updated identifier from among the extracted identifiers. The reflecting unit 6f reflects, in the corresponding replica DB 6a or the replica DB 6b, pre-update data that is associated with an identifier of update information that is created later than that specified by the specifying unit 6e. Examples of when the specifying unit 6e and the reflecting unit 6f operate include when an instruction is received from an operator, when a problem is detected at the main center, and when the communication with the main center is disconnected.

As described above, the backup system according to the first embodiment reflects data in each replica DB as needed without temporarily suspending a journal that is received from the master DB. If a problem occurs in the master DB, the backup system restores data contained in each replica DB to a point at which data is consistent. By doing so, it is possible to reduce the time taken to reflect data in a replica DB and the time taken to resume the operation after a problem occurs.

[b] Second Embodiment

In the following, in a second embodiment, as illustrated in FIG. 1, a description will be given of a database management apparatus that updates a master DB at the main center and a database management apparatus that updates a replica DB at the backup center. In the second embodiment, a configuration example of each of the database management apparatuses, the flow of processes, and the like will be described.

Database Management Apparatus (Main Center)

Figure 2:
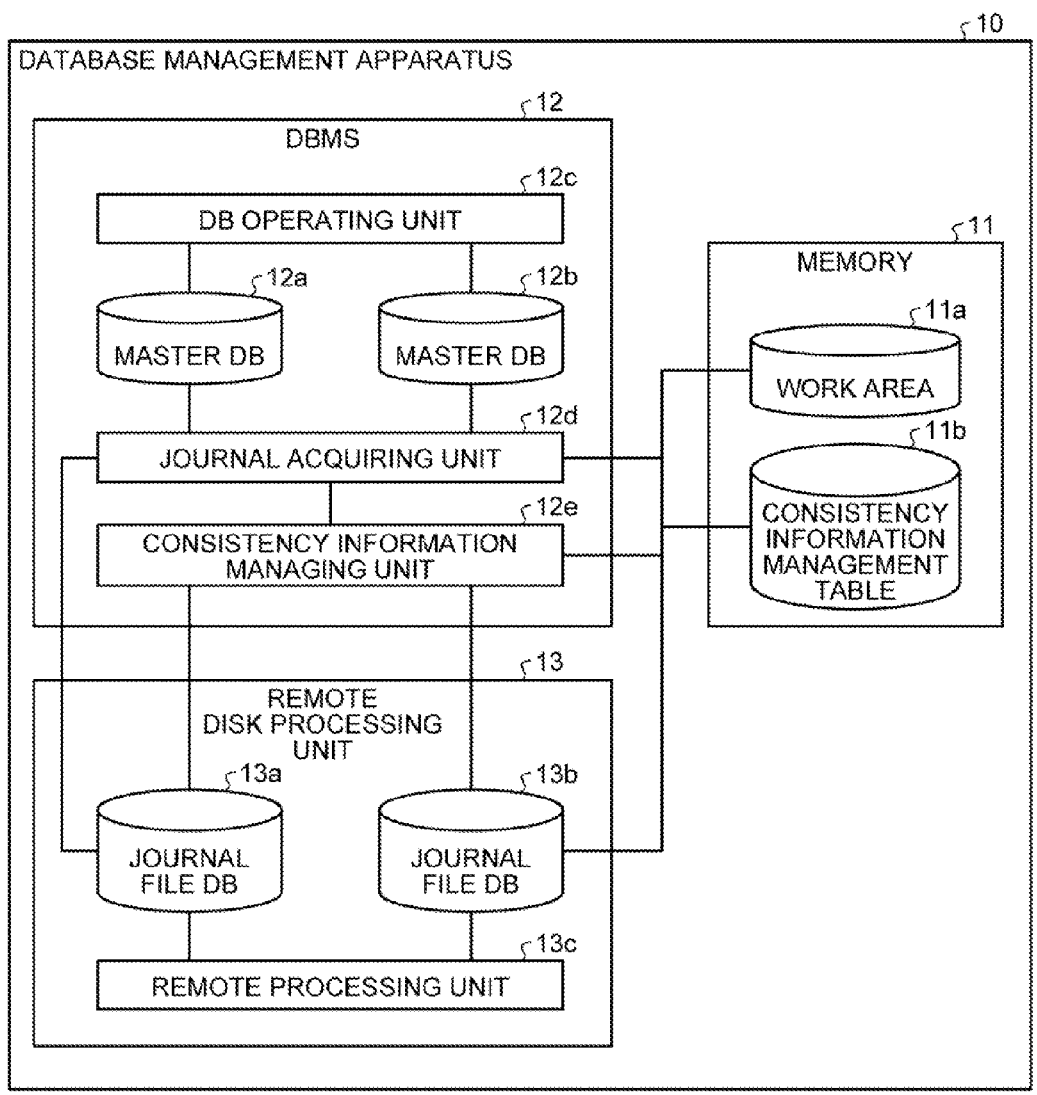
FIG. 2 is a functional block diagram illustrating the configuration of a database management apparatus that executes a DBMS at a main center according to a second embodiment.

FIG. 2 is a functional block diagram illustrating the configuration of a database management apparatus that executes a DBMS at a main center according to a second embodiment. As illustrated in FIG. 2, a database management apparatus 10 includes a memory 11, a DBMS 12, and a remote disk processing unit 13. The units illustrated in FIG. 2 are only examples and are not limited thereto. For example, the database management apparatus 10 may also include an input unit, such as a mouse, a display unit, such as a display, and a network interface card. Each processing unit is executed by a processor or the like.

The memory 11 stores therein programs executed by the DBMS 12, the remote disk processing unit 13, or the like and includes a work area 11a and a consistency information management table 11b. The work area 11a is a temporary region that is used when the DBMS 12 or the remote disk processing unit 13 performs a process.

The consistency information management table 11b is a table that manages transaction consistency information that is added to a journal. FIG. 3 is a schematic diagram illustrating an example of information stored in a consistency information management table. As illustrated in FIG. 3, the consistency information management table 11b stores therein the "journal name, transaction consistency information" in an associated manner. In the consistency information management table 11b, the "journal name" is an identifier for identifying a journal, whereas the "transaction consistency information" is an identifier for identifying a transaction that is added to the journal. The example illustrated in FIG. 3 indicates that "1" is allocated to the journal "xxx" as the transaction consistency information.

The DBMS 12 is a processing unit that includes a master DB 12a, a master DB 12b, a DB operating unit 12c, a journal acquiring unit 12d, and a consistency information managing unit 12e and that updates each master DB using a transaction.

The master DB 12a and the master DB 12b are databases that are the source of the replica DBs managed by the backup center. For example, the master DB 12a is a sales database that stores therein product sales data, whereas the master DB 12b is an inventory database that stores therein a product inventory. In general, because the amount of inventory decreases as the sales volume increases, if the master DB 12a is updated, the master DB 12b is also updated.

The DB operating unit 12c is a processing unit that executes a transaction that updates each master DB by a task process executed by the information processing apparatus.

The journal acquiring unit 12d is a processing unit that operates in cooperation with the DB operating unit 12c and that, if a master DB is updated, extracts an update difference. Specifically, the journal acquiring unit 12d extracts, for each master DB, updated information as a journal. Then, the journal acquiring unit 12d requests, from the consistency information managing unit 12e, a notification of transaction consistency information that is used to identify a transaction that updates a master DB. Then, the journal acquiring unit 12d adds the transaction consistency information notified from the consistency information managing unit 12e to the extracted journal and stores it in the journal file DB.

For example, the journal acquiring unit 12d extracts a journal from the master DB 12a; adds, if "1" is notified as the transaction consistency information, the transaction consistency information "1" to the extracted journal; and stores it in a journal file DB 13a. Similarly, the journal acquiring unit 12d extracts a journal from the master DB 12b. If "1" is notified as the transaction consistency information, the journal acquiring unit 12d stores, in a journal file DB 13b, a journal file in which the transaction consistency information "1" is added to the extracted journal.

The consistency information managing unit 12e is a processing unit that operates in cooperation with the journal acquiring unit 12d and manages the transaction consistency information. Specifically, if a notification of the transaction consistency information is requested from the journal acquiring unit 12d, the consistency information managing unit 12e refers to the consistency information management table 11b. Then, the consistency information managing unit 12e notifies the journal acquiring unit 12d of a value, which is obtained by incrementing the value of the transaction consistency information stored in the consistency information management table 11b, as transaction consistency information. At this time, the consistency information managing unit 12e acquires a journal name from the journal acquiring unit 12d, associates the journal name with the notified transaction consistency information, and stores them in the consistency information management table 11b.

The remote disk processing unit 13 is a processing unit that includes the journal file DB 13a, the journal file DB 13b, and a remote processing unit 13c and that retains the equivalence of journal file DBs arranged in the backup center. The remote disk processing unit 13 is connected to a database management apparatus 20 at the backup center via a communication line.

The journal file DB 13a is a database to which a journal file including a journal for the master DB 12a is written and that is updated by the journal acquiring unit 12d as needed. The journal file DB 13b is a database to which a journal file including a journal for the master DB 12b is written and that is updated by the journal acquiring unit 12d as needed.

The remote processing unit 13c is a processing unit that reads, as needed, a journal file written to a journal file DB and transfers the journal file to the backup center. The timing of the remote processing unit 13c reading a journal file and transferring the journal file can be arbitrarily set, e.g., every time a journal file is written to the journal file DB, at predetermined intervals, or when a predetermined number of journal files has been accumulated. Furthermore, the remote processing unit 13c asynchronously transfers a journal file between the journal file DBs.

FIG. 4 is a schematic diagram illustrating an example of a journal file transferred from the main center to the backup center. As illustrated in FIG. 4, the remote processing unit 13c transfers, to the backup center, a journal file that includes the "update destination, location, transaction consistency information, and contents of updated DB". The "update destination" is the name of an updated master DB, such as a schema name. The "location" is information that indicates the update location of the updated master DB, such as a physical block number. The "transaction consistency information" is an identifier managed by the consistency information managing unit 12e and is the identifier of a transaction added by the journal acquiring unit 12d. The "contents of updated DB" is the specific contents of the update, i.e., the specific contents of the updated data.

Database Management Apparatus (Backup Center)

Figure 5:
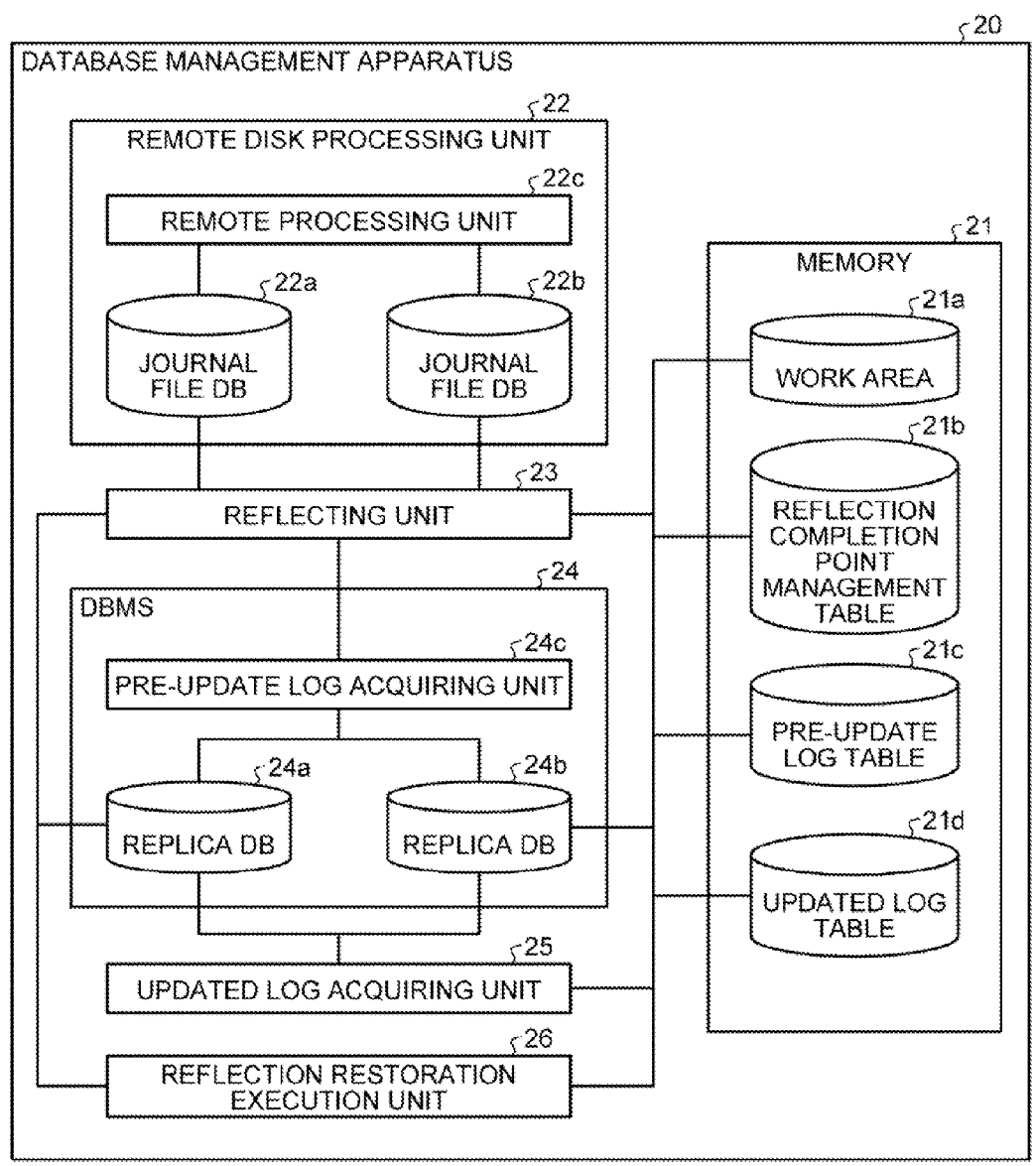
FIG. 5 is a functional block diagram illustrating the configuration of the database management apparatus that executes the DBMS at a backup center according to the second embodiment.

FIG. 5 is a functional block diagram illustrating the configuration of the database management apparatus that executes the DBMS at a backup center according to the second embodiment. As illustrated in FIG. 5, the database management apparatus 20 includes a memory 21, a remote disk processing unit 22, a reflecting unit 23, a DBMS 24, an updated log acquiring unit 25, and a reflection restoration execution unit 26. The units illustrated in FIG. 5 are only examples and are not limited thereto. For example, the database management apparatus 20 may also include an input unit, such as a mouse, a display unit, such as a display, and a network interface card. Each processing unit is executed by a processor or the like.

The memory 21 stores therein a program executed by each processing unit and includes a work area 21a, a reflection completion point management table 21b, a pre-update log table 21c, and an updated log table 21d. The work area 21a is a temporary region that is used when each processing unit performs a process.

The reflection completion point management table 21b is a table that stores therein, for each replica DB, transaction consistency information in a journal file that has been reflected in a replica DB by the reflecting unit 23. FIG. 6 is a schematic diagram illustrating an example of information stored in a reflection completion point management table. As illustrated in FIG. 6, the reflection completion point management table 21b stores therein, in an associated manner, the "replica DB name, reflection completion point".

In the reflection completion point management table 21b, the "replica DB name" is a name of a replica DB, whereas the "reflection completion point" is the latest transaction consistency information that has been subjected to the reflection. The example illustrated in FIG. 6 indicates that, in a replica DB 24a, the reflection has been completed in the journal file to which "5" is allocated as the transaction consistency information. Furthermore, in a replica DB 24b, the reflection has been completed to the journal file to which "6" is allocated as transaction consistency information. The information stored in replica DBs is updated by the reflecting unit 23.

The pre-update log table 21c is a table that accumulates and stores therein, for each replica DB, log information that has not been updated and that is acquired by a pre-update log acquiring unit 24c. FIG. 7 is a schematic diagram illustrating an example of information stored in a pre-update log table. As illustrated in FIG. 7, the pre-update log table 21c stores therein, in an associated manner, the "update destination, location, transaction consistency information, and contents of pre-update DB". The "update destination, location, and transaction consistency information" stored in this table is the same as that illustrated in FIG. 4; therefore, a description thereof in detail will be omitted here. The "contents of pre-update DB" is specific contents before the update, i.e., the specific contents of data that has not been updated.

The updated log table 21d is a table that accumulates and stores therein, for each replica DB, log information that has been updated and acquired by the updated log acquiring unit 25. The information stored in this table is the same as that illustrated in FIG. 4; therefore, a description thereof in detail will be omitted here.

The remote disk processing unit 22 is a processing unit that includes a journal file DB 22a, a journal file DB 22b, and a remote processing unit 22c and that retains the equivalence of journal file DBs arranged at the main center. The remote disk processing unit 22 is connected to the database management apparatus 20 at the main center via a communication line.

The journal file DB 22a is a database to which a journal file to be reflected in the replica DB 24a is written and that is updated by the remote processing unit 22c. The journal file DB 22b is a database to which a journal file that is to be reflected in the replica DB 24b is written and that is updated by the remote processing unit 22c.

The remote processing unit 22c is a processing unit that stores, in a corresponding journal file DB, a journal file transferred from the main center to the database management apparatus 10.

The reflecting unit 23 is a processing unit that reads a journal file from each journal file DB and that updates the corresponding replica DB such that the contents of the replica DB become the same as that of the journal. The reflecting unit 23 reflects, in the replica DB 24a, a journal read from the journal file DB 22a and reflects, in the replica DB 24b, the journal read from the journal file DB 22b.

Specifically, if the reflecting unit 23 reads a journal file from the journal file DB 22a, the reflecting unit 23 specifies the "update destination" and the "location" from the journal file. Then, the reflecting unit 23 reflects, in the "update destination" and the "location" in the replica DB 24a, the "contents of updated DB" stored in a journal file. Then, the reflecting unit 23 stores, in the reflection completion point management table 21b in an associated manner with the replica DB 24a, the "transaction consistency information" contained in a journal file that has been subjected to the reflection. The reflecting unit 23 performs the above process on each replica DB.

Specifically, if the reflecting unit 23 reads a journal file from the journal file DB 22a, the reflecting unit 23 starts a transaction that reflects a journal and notifies the DBMS 24 of the start of the transaction. Then, the reflecting unit 23 specifies, from the read journal file, the "update destination" and the "location" and instructs the DBMS 24 to reflects the "contents of updated DB" in the specified "update destination" and the "location". Thereafter, the reflecting unit 23 stores, in the reflection completion point management table 21b, the "transaction consistency information" on the read journal file; ends the transaction; and notifies the DBMS 24 of the end of the transaction.

The DBMS 24 is a processing unit that includes the replica DB 24a, the replica DB 24b, and the pre-update log acquiring unit 24c and that updates each replica DB using a transaction. The DBMS 24 receives a journal reflection instruction from the reflecting unit 23 and reflects the journal in a corresponding update location in a corresponding replica DB.

The replica DB 24a is a replication destination database that is used to replicate data stored in the master DB 12a. The replica DB 24b is a replication destination database that is used to replicate data stored in the master DB 12b.

The pre-update log acquiring unit 24c is a processing unit that operates in cooperation with the DBMS 24. If the DBMS 24 updates a replica DB instructed by the reflecting unit 23, the pre-update log acquiring unit 24c associates pre-update data with the transaction consistency information and stores it in the pre-update log table 21c. Specifically, the pre-update log acquiring unit 24c reads, from a corresponding replica DB, data associated with the "update destination" and the "location" notified from the reflecting unit 23. Then, the pre-update log acquiring unit 24c stores, in an associated manner in the pre-update log table 21c, the read data; the name of the read DB, i.e., the "update destination"; the read location; and "transaction consistency information" on a journal file that receives notification from the reflecting unit 23.

Specifically, if the reflecting unit 23 starts a transaction and the DBMS 24 receives a journal reflection instruction, the pre-update log acquiring unit 24c extracts an "update destination" and a "location" from the journal file that receives notification the reflecting unit 23. It is assumed that the journal file is read from the journal file DB 22b. In this case, the pre-update log acquiring unit 24c extracts "data" from the "update destination" and the "location" stored in the journal file DB 22b. Furthermore, the pre-update log acquiring unit 24c extracts "transaction consistency information" from the journal file that that receives notification the reflecting unit 23. Then, the pre-update log acquiring unit 24c stores, in an associated manner in the pre-update log table 21c, the extracted "update destination", the "location", the "data", and the "transaction consistency information".

The updated log acquiring unit 25 is a processing unit that monitors each replica DB; specifies, if a replica DB is updated, an updated portion; and stores the updated log in the updated log table 21d. The updated log acquiring unit 25 may also acquire the updated contents, the updated location, the update destination, the transaction consistency information, and the like from the reflecting unit 23 or the DBMS 24.

The reflection restoration execution unit 26 is a processing unit that reads a pre-update log stored in the pre-update log table 21c and updates a replica DB to the state before the update, thereby the replica DB is restored to the transaction consistency state. Furthermore, the reflection restoration execution unit 26 determines whether a replica DB is updated to the state before the update by using transaction consistency information stored in the pre-update log and using transaction consistency information managed by the reflection completion point management table 21b. Examples of when the reflection restoration execution unit 26 restores the reflection include when an instruction is received from an operator, when a problem is detected at the main center, and when the communication with the main center is disconnected.

The reflection restoration execution unit 26 refers to the reflection completion point management table 21b and specifies "transaction consistency information" that has the minimum value and that is associated with each replica DB. Then, the reflection restoration execution unit 26 refers to, in chronological order in the pre-update log table 21c and starting with the oldest pre-update log, the pre-update logs that are associated with the replica DB 24a. Then, the reflection restoration execution unit 26 specifies a pre-update log that is associated with "transaction consistency information" having a value greater than that of the specified "transaction consistency information" having the minimum value. Then, the reflection restoration execution unit 26 reflects the "contents of pre-update DB" in the "update destination" and the "location" stored in the specified pre-update log in the replica DB 24a.

Similarly, the reflection restoration execution unit 26 refers to, in chronological order in the pre-update log table 21c and starting with the oldest pre-update log, the pre-update logs that are associated with the replica DB 24b. Then, the reflection restoration execution unit 26 specifies a pre-update log that is associated with "transaction consistency information" having a value greater than that of the specified "transaction consistency information" having the minimum value. Then, the reflection restoration execution unit 26 reflects the "contents of pre-update DB" in the "update destination" and the "location" stored in the specified pre-update log in the replica DB 24b.

The reflection restoration execution unit 26 may also delete, from the updated log table 21d, an updated log that has the same information as that containing the "update destination" and the "location" that are obtained by reflecting a pre-update log. Furthermore, the reflection restoration execution unit 26 may also add, for example, a flag indicating that the state is restored to the state before the update.

Flow of a Process

In the following, the flow of a process performed by the database management apparatus 10 in the main center or the database management apparatus 20 in the backup center.

Flow of a Process Performed at the Main Center

Figure 8:
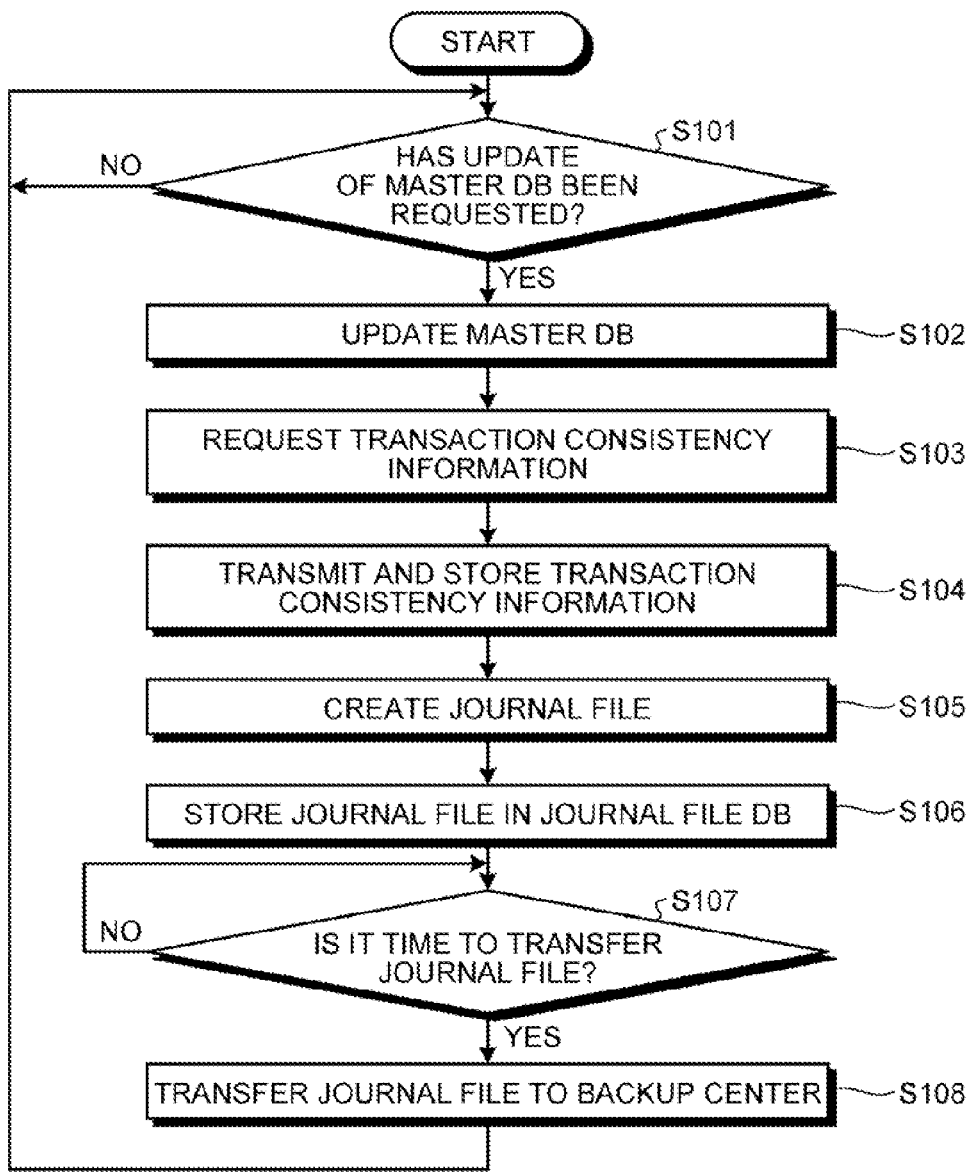
FIG. 8 is a flowchart illustrating the flow of a process performed at the main center according to the second embodiment.

FIG. 8 is a flowchart illustrating the flow of a process performed at the main center according to the second embodiment. As illustrated in FIG. 8, if an update of the master DB is requested by the information processing apparatus (Yes at Step S101), the DB operating unit 12c in the DBMS 12 executes a transaction to update each master DB (Step S102).

Then, the journal acquiring unit 12d extracts a journal stored in each master DB and requests the consistency information managing unit 12e to acquire transaction consistency information (Step S103). Subsequently, the consistency information managing unit 12e sends back, to the journal acquiring unit 12d, a value obtained by incrementing a value of the transaction consistency information stored in the consistency information management table 11b and stores it in the consistency information management table 11b (Step S104).

Thereafter, the journal acquiring unit 12d creates a journal file in which the notified transaction consistency information is added to the extracted journal (Step S105) and stores it in each journal file DB (Step S106).

Then, if it is time to perform the transmission (Yes at Step S107), the remote processing unit 13c reads a journal file from each journal file DB and transfers the journal file to the backup center (Step S108). Thereafter, the database management apparatus 10 returns to Step S101 and repeats the processes.

Flow of a DB Reflection Process Performed at the Backup Center

Figure 9:
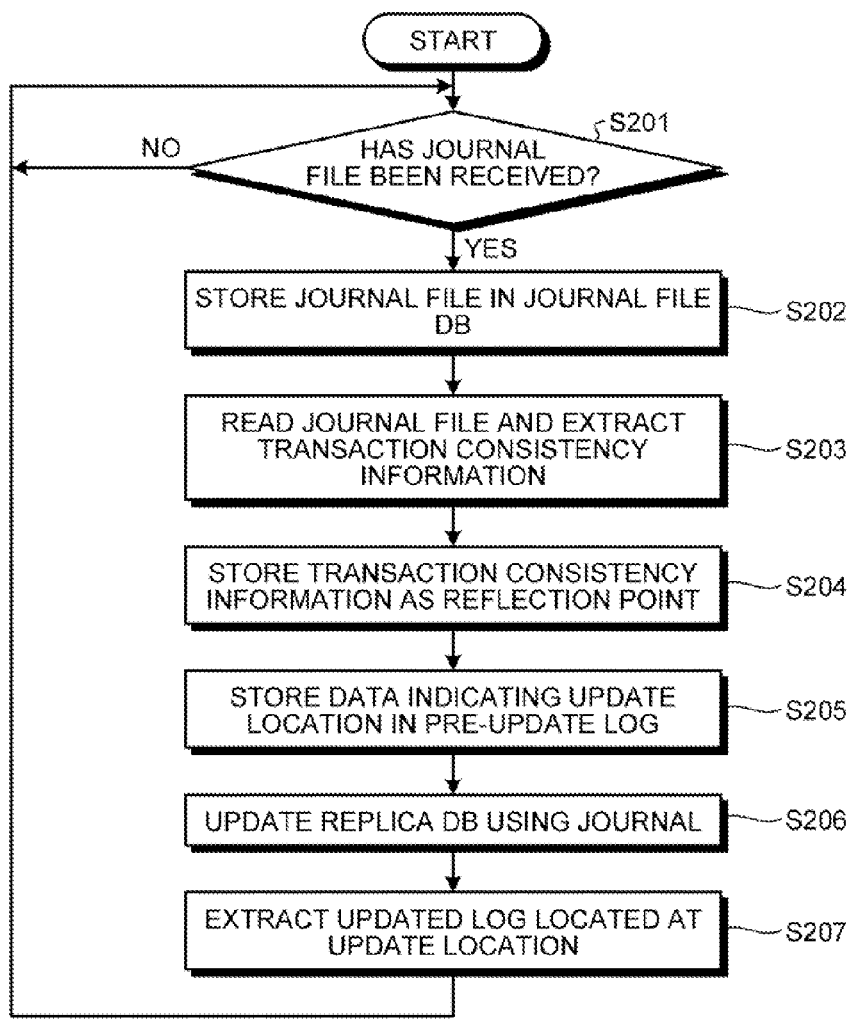
FIG. 9 is a flowchart illustrating the flow of a DB reflection process performed at the backup center according to the second embodiment.

FIG. 9 is a flowchart illustrating the flow of a DB reflection process performed at the backup center according to the second embodiment. As illustrated in FIG. 9, if the remote processing unit 22c receives a journal file from the main center (Yes at Step S201), the remote processing unit 22c stores the journal file in a corresponding journal file DB (Step S202).

Then, the reflecting unit 23 reads a journal file from each journal file DB and extracts transaction consistency information (Step S203). Subsequently, the reflecting unit 23 associates the transaction consistency information extracted from the journal files stored in the replica DBs with the replica DBs and stores them in the reflection completion point management table 21b (Step S204).

Then, the pre-update log acquiring unit 24c specifies an update location from the journal file extracted by the reflecting unit 23 and stores, in the pre-update log table 21c as a pre-update log, data indicating the specified update location (Step S205).

Thereafter, the reflecting unit 23 outputs, to the DBMS 24, an instruction to reflect a subject replica DB indicated by a journal contained in a journal file, and then the DBMS 24 reflects the journal (Step S206). The journal mentioned here means the information obtained by excluding transaction consistency information from a journal file. Then, the updated log acquiring unit 25 extracts an updated log of an update location in which a replica DB is updated and stores it in the updated log table 21d (S207). Then, the database management apparatus 20 returns to Step S201 and repeats processes.

Flow of a Reflection Restoration Process Performed at the Backup Center

Figure 10:
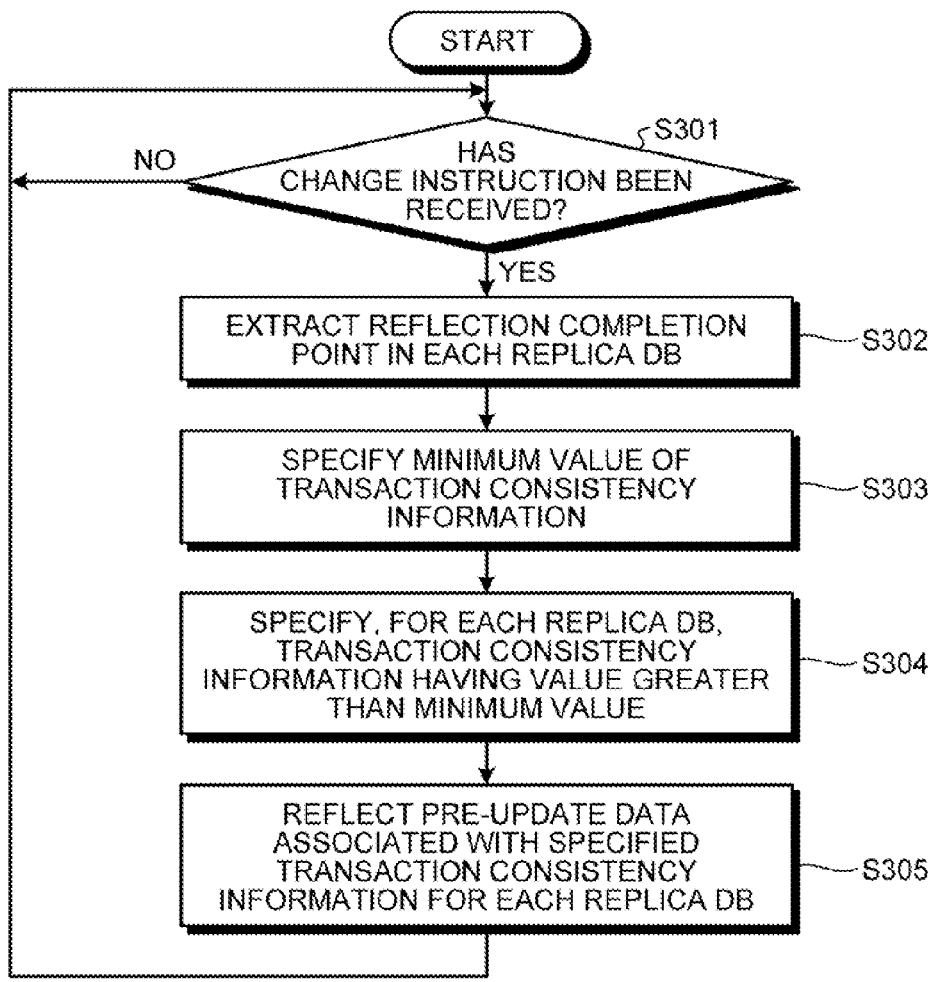
FIG. 10 is a flowchart illustrating the flow of a DB reflection restoration process performed at the backup center according to the second embodiment.

FIG. 10 is a flowchart illustrating the flow of a DB reflection restoration process performed at the backup center according to the second embodiment. As illustrated in FIG. 10, if the reflection restoration execution unit 26 receives a change instruction from an operator or the like (Yes at Step S301), the reflection restoration execution unit 26 refers to the reflection completion point management table 21b and extracts a reflection completion point stored in each replica DB (Step S302).

Then, the reflection restoration execution unit 26 specifies the extracted reflection completion point in each replica DB, i.e., the minimum value of the transaction consistency information (Step S303). Thereafter, the reflection restoration execution unit 26 refers to the pre-update log table 21c and specifies, for each replica DB, a pre-update log that contains transaction consistency information having a value greater than the minimum value (Step S304).

Then, the reflection restoration execution unit 26 reflects, in a corresponding update location for each replica DB, pre-update data in the pre-update log that contains transaction consistency information having a value greater than the specified minimum value (Step S305). Thereafter, the database management apparatus 20 returns to Step S301 and repeats the processes.

Explanation of a Transaction

Figure 11:
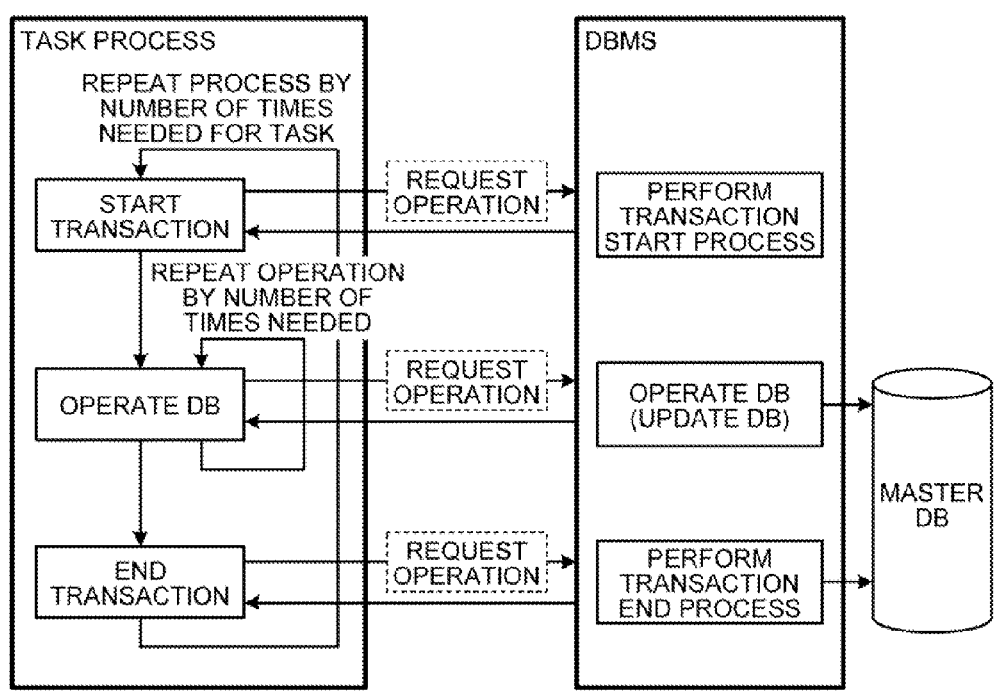
FIG. 11 is a schematic diagram illustrating a transaction that updates a master DB in the main center.

FIG. 11 is a schematic diagram illustrating a transaction that updates a master DB at the main center. As illustrated in FIG. 11, if a task process executed by an information processing apparatus starts a transaction, the task process transmits, to the DBMS 12, an operation request for the start of a transaction process, and the DBMS 12 starts a transaction that updates a master DB.

Then, if the task process executes a specific DB operation, i.e., a data update or the like, the task process requests the DBMS 12 to execute the operation of the data update and, in response to the request, the DBMS 12 updates the master DB. The task process executes this process by the same number of times as there are to be performed.

If the process for executing the data update ends, the task process transmits, to the DBMS 12, an operation request for the end of the transaction, and the DBMS 12 ends the transaction that updates the master DB. The task process repeats the start of a transaction, the DB operation, and the end of the transaction in accordance with the task.

Flow of a Journal Acquisition Process Performed at the Main Center

Figure 12:
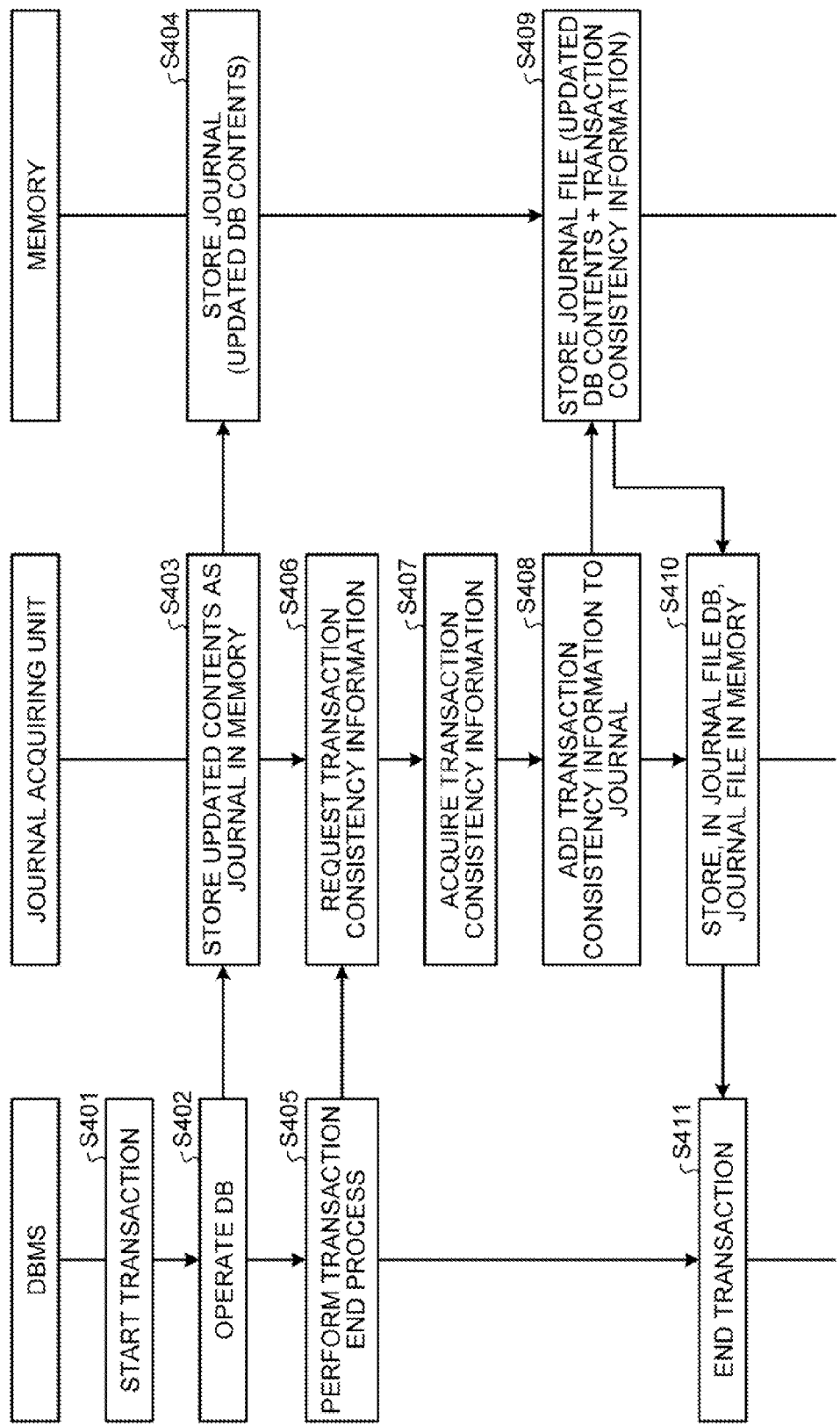
FIG. 12 is a sequence diagram illustrating the flow of a journal acquisition process performed at the main center.

FIG. 12 is a sequence diagram illustrating the flow of a journal acquisition process performed at the main center. As illustrated in FIG. 12, if the DB operating unit 12c in the DBMS 12 starts a transaction process (Step S401), the DB operating unit 12c executes an operation for updating a DB and notifies the journal acquiring unit 12d that the DB is updated (Step S402).

The journal acquiring unit 12d extracts, as a journal, the updated contents from the updated master DB and stores it in, for example, the work area 11a in the memory 11 (Steps S403 and S404). Then, if the update of the master DB has been completed, the DB operating unit 12c in the DBMS 12 notifies the journal acquiring unit 12d of the end of the transaction process (Step S405).

The journal acquiring unit 12d requests the consistency information managing unit 12e to acquire transaction consistency information (Step S406) and acquires, from the consistency information managing unit 12e, transaction consistency information that is incremented (Step S407). Then, the journal acquiring unit 12d adds the acquired transaction consistency information to the journal that is stored in the memory 11 at Step S404 and creates a journal file (Steps S408 and S409).

Thereafter, the journal acquiring unit 12d reads the journal file from the work area 11a in the memory 11 and stores the journal file in a corresponding journal file DB (Step S410). Then, if the journal file is stored in a DB by the journal acquiring unit 12d, the DB operating unit 12c in the DBMS 12 ends the transaction process (Step S411).

Flow of the Journal Reflection Process Performed at the Backup Center

Figure 13:
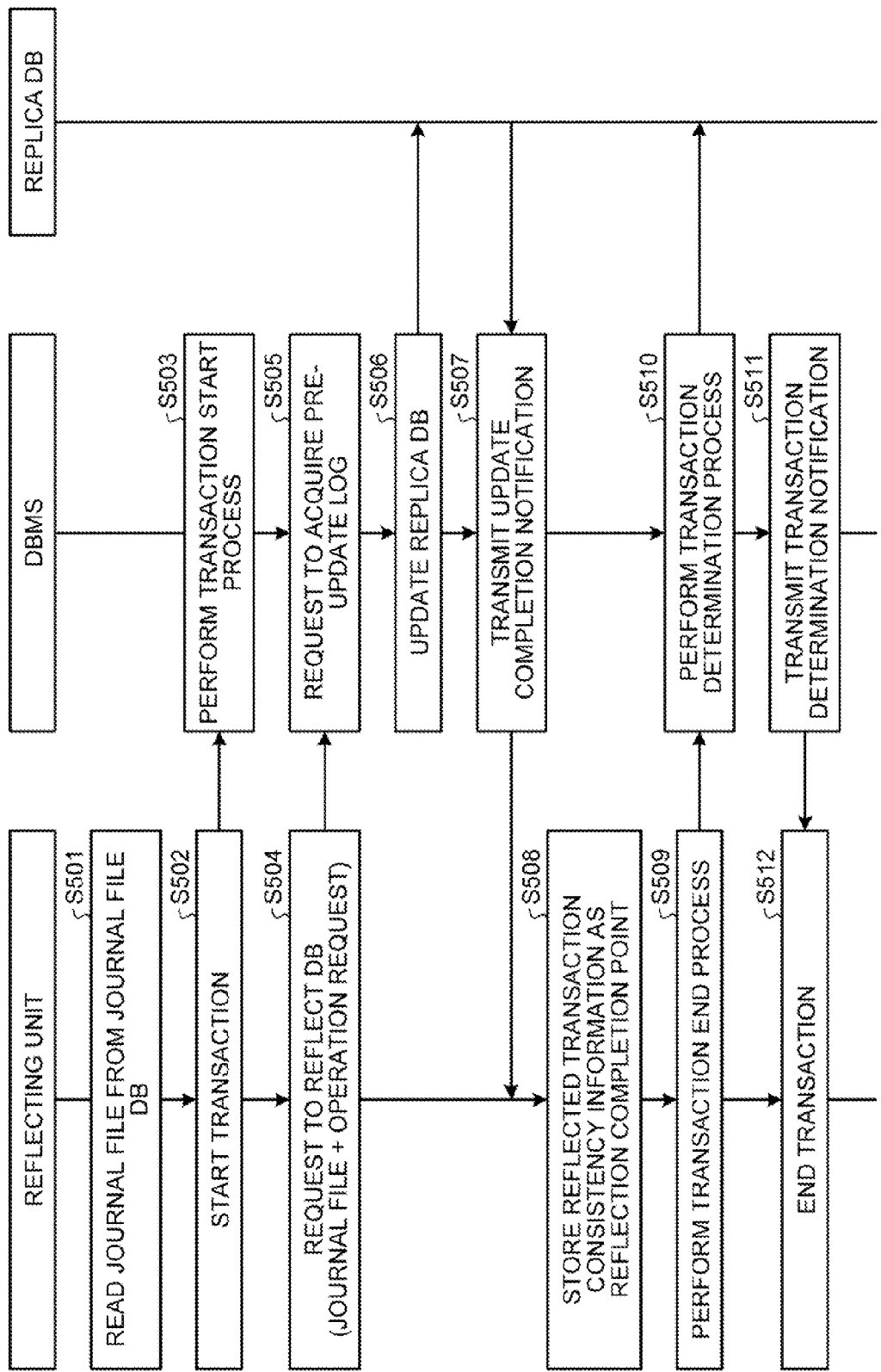
FIG. 13 is a sequence diagram illustrating the flow of a journal reflection process performed at the backup center.

FIG. 13 is a sequence diagram illustrating the flow of a journal reflection process performed at the backup center. This process is performed for each replica DB. As illustrated in FIG. 13, the reflecting unit 23 reads a journal file from each journal file DB (Step S501) and starts the transaction process (Step S502). If the DBMS 24 receives a notification of the start of the transaction from the reflecting unit 23, the DBMS 24 starts the transaction process for executing a process for reflecting data in each replica DB (Step S503).

Then, the reflecting unit 23 transmits, to the DBMS 24, a request for reflecting a DB together with a journal file and an instruction to operate the DB (Step S504), and the DBMS 24 requests the pre-update log acquiring unit 24c to acquire a pre-update log (Step S505). Thereafter, the DBMS 24 updates data by reflecting the journal in a corresponding replica DB (Step S506) and notifies the reflecting unit 23 of the completion of the update (Step S507).

Then, the reflecting unit 23 stores, in the reflection completion point management table 21b for each replica DB as a reflection completion point, transaction consistency information stored in the reflected journal file (Step S508). Then, the reflecting unit 23 starts the end process of the transaction (Step S509), and the DBMS 24 performs a transaction determination process and determines data reflected in each replica DB (Step S510).

Thereafter, the DBMS 24 notifies the reflecting unit 23 of the determination of the transaction (Step S511). The reflecting unit 23 that receives this notification ends the transaction process (Step S512).

Flow of the Pre-Update Log Acquisition Process Performed at the Backup Center

Figure 14:
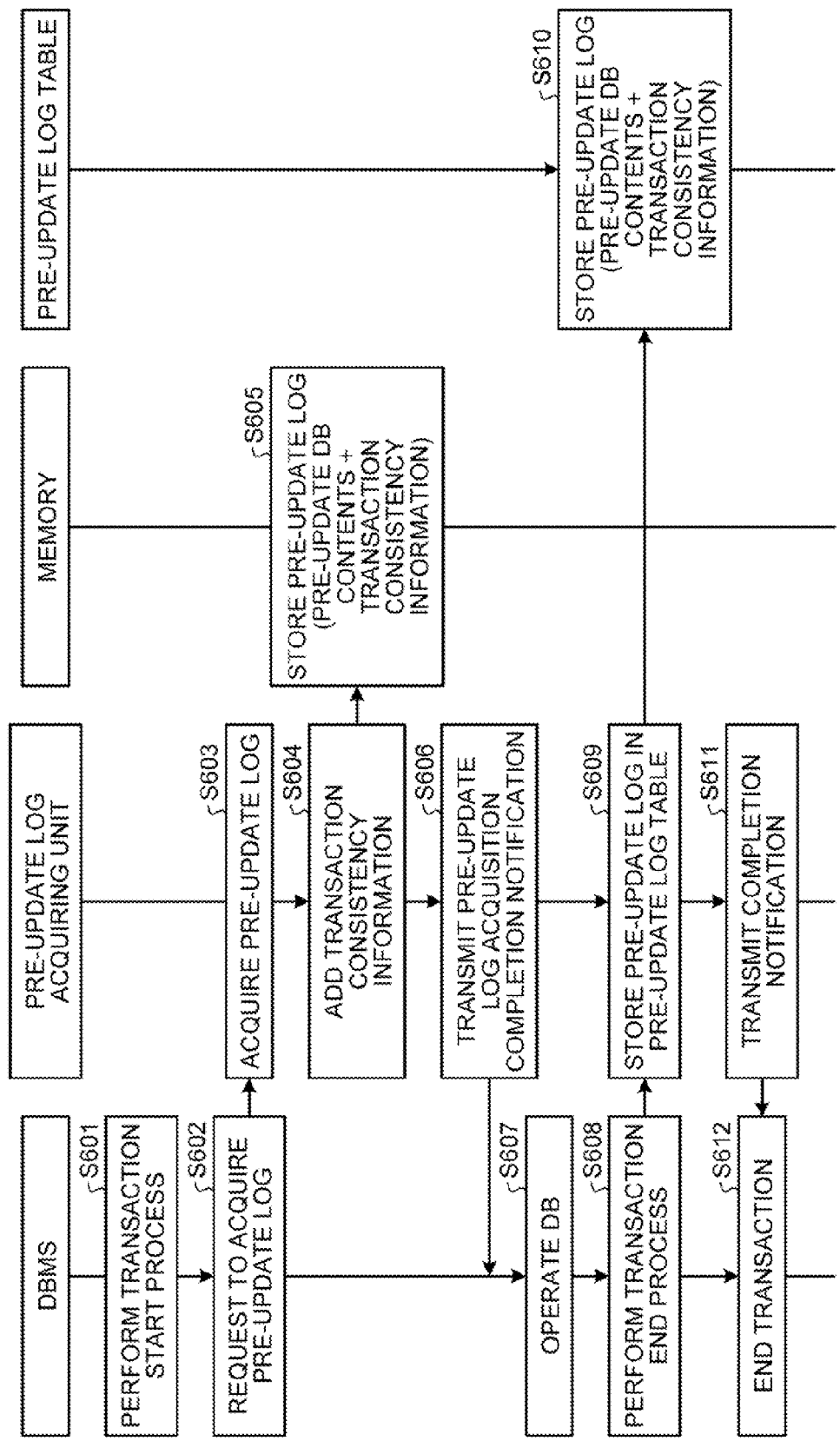
FIG. 14 is a sequence diagram illustrating a pre-update log acquisition process performed at the backup center.

FIG. 14 is a sequence diagram illustrating a pre-update log acquisition process performed at the backup center. If the DBMS 24 starts the transaction process for reflecting a journal in a replica DB (Step S601), the DBMS 24 requests the pre-update log acquiring unit 24c to acquire a pre-update log in a corresponding replica DB (Step S602).

The pre-update log acquiring unit 24c specifies an update destination and a location from the journal file received from the reflecting unit 23 and acquires pre-update data from the update destination and the location stored in the corresponding replica DB (Step S603). Subsequently, the pre-update log acquiring unit 24c acquires transaction consistency information from the journal file that is received from the reflecting unit 23; adds the transaction consistency information to the pre-update log (Step S604); and stores it in, for example, the work area 21a in the memory 21 (Step S605). Thereafter, the pre-update log acquiring unit 24c notifies the DBMS 24 of the acquisition of the pre-update log (Step S606).

Then, the DBMS 24 that receives this notification reflects, on the basis of the journal file received from the reflecting unit 23, the journal in a replica DB (Step S607). Thereafter, the DBMS 24 starts the end process of the transaction process in which a journal is reflected in a replica DB (Step S608). Then, the pre-update log acquiring unit 24c reads a pre-update log stored in the work area 21a and stores it in the pre-update log table 21c (Steps S609 and S610).

The pre-update log acquiring unit 24c notifies the DBMS 24 of the completion notification indicating that the pre-update log is stored in the pre-update log table 21c (Step S611). The DBMS 24 that receives this notification ends the transaction process (Step S612).

Specific Example of a Process

Figure 15:
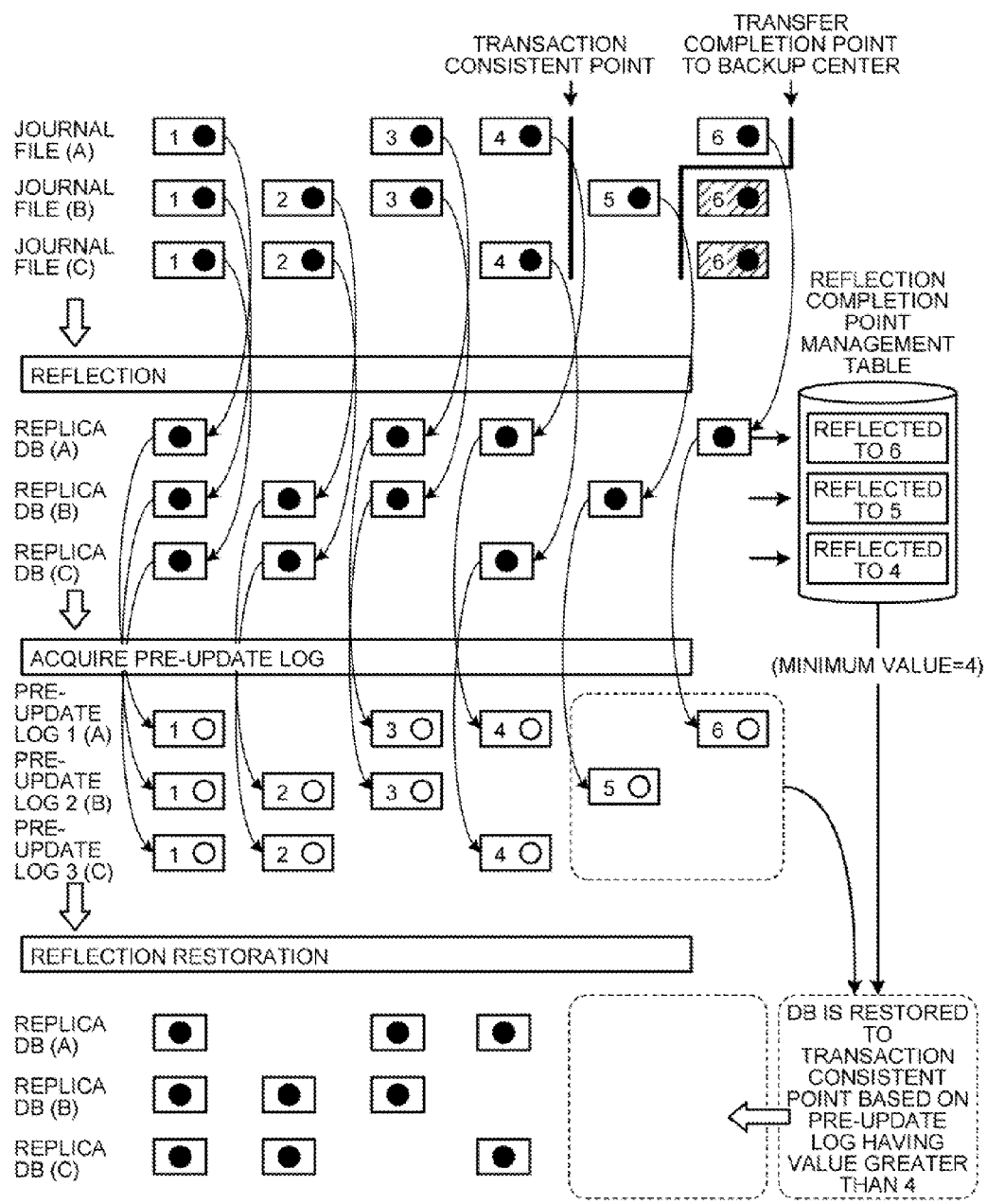
FIG. 15 is a schematic diagram illustrating a series of processes from the journal reflection to a reflection restoration to a replica DB.

FIG. 15 is a schematic diagram illustrating a series of processes between the journal reflection and a reflection restoration performed on a replica DB. In this example, a description will be given of a case that includes a replica DB (A), a replica DB (B), and a replica DB (C); and the replica DB (A), the replica DB (B), and the replica DB (C) include a journal file DB (A), a journal file DB (B), and a journal file DB (C), respectively.

As illustrated in FIG. 15, as a first generation journal file, the remote processing unit 22c in the database management apparatus 20 receives three journal files, in which the transaction consistency information is "1", and stores them in the corresponding journal file DBs. Specifically, the database management apparatus 20 receives, as a first generation journal file, a journal for each replica DB.

The reflecting unit 23 reads the journal file from each journal file DB and reflects the contents of the journal file in each replica DB. Then, the reflecting unit 23 updates the reflection completion point of each replica DB to 1. The pre-update log acquiring unit 24c acquires a pre-update log of each replica DB before each replica DB is updated and stores, for each replica DB, the pre-update log in the pre-update log table 21c.

Then, as a second generation journal file, the remote processing unit 22c receives two journal files, in which the transaction consistency information is "2", and stores one of the journal files in the journal file DB (B) and one of the journal files in the journal file DB (C). Specifically, the database management apparatus 20 receives, as a second generation journal file, a journal for the replica DB (B) and a journal for the replica DB (C).

The reflecting unit 23 reads the journal file from the journal file DB (B) and reflects, in the replica DB (B), the contents of the journal file. Similarly, the reflecting unit 23 reads the journal file from the journal file DB (C) and reflects, in the replica DB (C), the contents of the journal file. Then, the reflecting unit 23 updates the reflection completion point of each of the replica DB (B) and the replica DB (C) to 2 and leaves the reflection completion point of the replica DB (A) unchanged as 1. Furthermore, the pre-update log acquiring unit 24c acquires a pre-update log of the replica DB (B) before the replica DB (B) is updated and stores the pre-update log in the pre-update log table 21c. Similarly, the pre-update log acquiring unit 24c acquires a pre-update log of the replica DB (C) before the replica DB (C) is updated and stores the pre-update log in the pre-update log table 21c.

Subsequently, as a third generation journal file, the remote processing unit 22c receives two journal files, in which the transaction consistency information is "3", and stores one of the journal files in the journal file DB (A) and one of the journal files in the journal file DB (B). Specifically, the database management apparatus 20 receives, as a third generation journal file, a journal for the replica DB (A) and a journal for the replica DB (B).

The reflecting unit 23 reads the journal file from the journal file DB (A) and reflects the contents of the journal file in the replica DB (A). Similarly, the reflecting unit 23 reads the journal file from the journal file DB (B) and reflects the contents of the journal file in the replica DB (B). Then, the reflecting unit 23 updates the reflection completion point of each of the replica DB (A) and the replica DB (B) to 3 and leaves the reflection completion point of the replica DB (C) unchanged as 2. Furthermore, the pre-update log acquiring unit 24c acquires a pre-update log of the replica DB (A) before the replica DB (A) is updated and stores the pre-update log in the pre-update log table 21c. Similarly, the pre-update log acquiring unit 24c acquires a pre-update log of the replica DB (B) before the replica DB (B) is updated and stores the pre-update log in the pre-update log table 21c.

Subsequently, as a fourth generation journal file, the remote processing unit 22c receives two journal files, in which the transaction consistency information is "4", and stores one of the journal files in the journal file DB (A) and one of the journal files the journal file DB (C). Specifically, the database management apparatus 20 receives, as fourth generation journal file, a journal for the replica DB (A) and a journal for the replica DB (C).

The reflecting unit 23 reads the journal file from the journal file DB (A) and reflects the contents of the journal file in the replica DB (A). Similarly, the reflecting unit 23 reads the journal file from the journal file DB (C) and reflects the contents of the journal file in the replica DB (C). Then, the reflecting unit 23 updates the reflection completion point of each of the replica DB (A) and the replica DB (C) to 4 and leaves the reflection completion point of the replica DB (B) unchanged as 3. Furthermore, the pre-update log acquiring unit 24c acquires a pre-update log of the replica DB (A) before the replica DB (A) is updated and stores the pre-update log in the pre-update log table 21c. Similarly, the pre-update log acquiring unit 24c acquires a pre-update log of the replica DB (C) before the replica DB (C) is updated and stores the pre-update log in the pre-update log table 21c.

Subsequently, as a fifth generation journal file, the remote processing unit 22c receives one journal file, in which the transaction consistency information is "5", and stores the journal file in the journal file DB (B). Specifically, the database management apparatus 20 receives, as a fifth generation journal file, a journal for the replica DB (B).

The reflecting unit 23 reads the journal file from the journal file DB (B) and reflects the contents of the journal file in the replica DB (B). Then, the reflecting unit 23 updates the reflection completion point of the replica DB (B) to 5 and leaves the reflection completion point of each of the replica DB (A) and the replica DB (C) unchanged as 4. Furthermore, the pre-update log acquiring unit 24c acquires a pre-update log of the replica DB (B) before the replica DB (B) is updated and stores the pre-update log in the pre-update log table 21c.

Subsequently, it is assumed that a problem occurs at the time at which a sixth generation journal file is received. However, the remote processing unit 22c receives one journal file, in which the transaction consistency information is "6", and stores the journal file in the journal file DB (A). Specifically, the database management apparatus 20 receives, as a sixth generation journal file, a journal for the replica DB (A).

The reflecting unit 23 reads the journal file from the journal file DB (A) and reflects the contents of the journal file in the replica DB (A). Then, the reflecting unit 23 updates the reflection completion point of the replica DB (A) to 6, leaves the reflection completion point of the replica DB (B) unchanged as 5, and leaves the reflection completion point of the replica DB (C) unchanged as 4. Furthermore, the pre-update log acquiring unit 24c acquires a pre-update log of the replica DB (A) before the replica DB (A) is updated and stores the pre-update log in the pre-update log table 21c.

Because the database management apparatus 20 detects a problem at the time at which a sixth generation journal file is received, the database management apparatus 20 performs the reflection restoration process. First, the reflection restoration execution unit 26 refers to the reflection completion point management table 21b and extracts, for each replica DB, a reflection completion point. Then, the reflection restoration execution unit 26 specifies the minimum value from among the extracted reflection completion points. In the above example, reflection completion point of the replica DB (A) is 6, the reflection completion point of the replica DB (B) is 5, and the reflection completion point of the replica DB (C) is 4. Accordingly, the reflection restoration execution unit 26 specifies that the minimum value is 4.

Then, the reflection restoration execution unit 26 restores a journal, in which the transaction consistency information is equal to or greater than 4, to the state before the reflection. Specifically, for the replica DB (A), the reflection restoration execution unit 26 refers to the pre-update log table 21c and specifies the pre-update log, in which the transaction consistency information is 6, as the pre-update log containing the transaction consistency information that is equal to or greater than 4. Then, the reflection restoration execution unit 26 reflects the contents of pre-update DB in the location of the update destination contained in the pre-update log that contains the transaction consistency information of 6 and then restores the state before the update.

Similarly, for the replica DB (B), the reflection restoration execution unit 26 refers to the pre-update log table 21c and specifies the pre-update log, in which the transaction consistency information is 5, as the pre-update log containing the transaction consistency information that is equal to or greater than 4. Then, the reflection restoration execution unit 26 reflects the contents of the pre-update DB in the location of the update destination contained in the pre-update log that contains the transaction consistency information of 5 and then restores the state before the update.

Furthermore, for the replica DB (C), the reflection restoration execution unit 26 refers to the pre-update log table 21c and specifies that a pre-update log containing the transaction consistency information of 4 is not present. Accordingly, the reflection restoration execution unit 26 does not perform the reflection restoration process on the replica DB (C). By doing so, the reflection status of each replica DB can be changed to the state in which the transaction consistency information is equal to or less than 4. Accordingly, it is possible to determine the consistency among the replica DBs.

With the backup system according to the second embodiment described above, in normal operations at the backup center, it is possible to unconditionally reflect a journal in a replica DB without worrying about transaction consistency. Accordingly, at the backup center, it is possible to implement real time reflection in which the reflection is performed on a replica DB upon receiving a journal. Furthermore, in normal operations in which the difference between transfer responses among journal files is small before a disaster occurs, the volume of the reflection restoration process performed when a disaster does occur is quite small, thus reducing the time taken to resume the operation after a problem occurs.

With the conventional technology, because the reflection is performed in a batch for each generation journal file, the number of transactions to be reflected is large after a disaster, such as thousands of transactions, thereby it takes a long time. However, with the backup system according to the second embodiment, because the reflection is performed in real time, it is possible to reduce the time taken to process the reflection restoration of the transactions.

[c] Third Embodiment

In the second embodiment, a description has been given of a case, as an example, in which a journal file and a replica DB are arranged as a pair, i.e., one to one. However, even if journals for multiple replica DBs are stored in a journal file, i.e., one to n, the above-described process can be similarly performed. Accordingly, in a third embodiment, a description will be given of a case, as an example, in which journals for multiple replica DBs are stored in a journal file.

Figure 16:
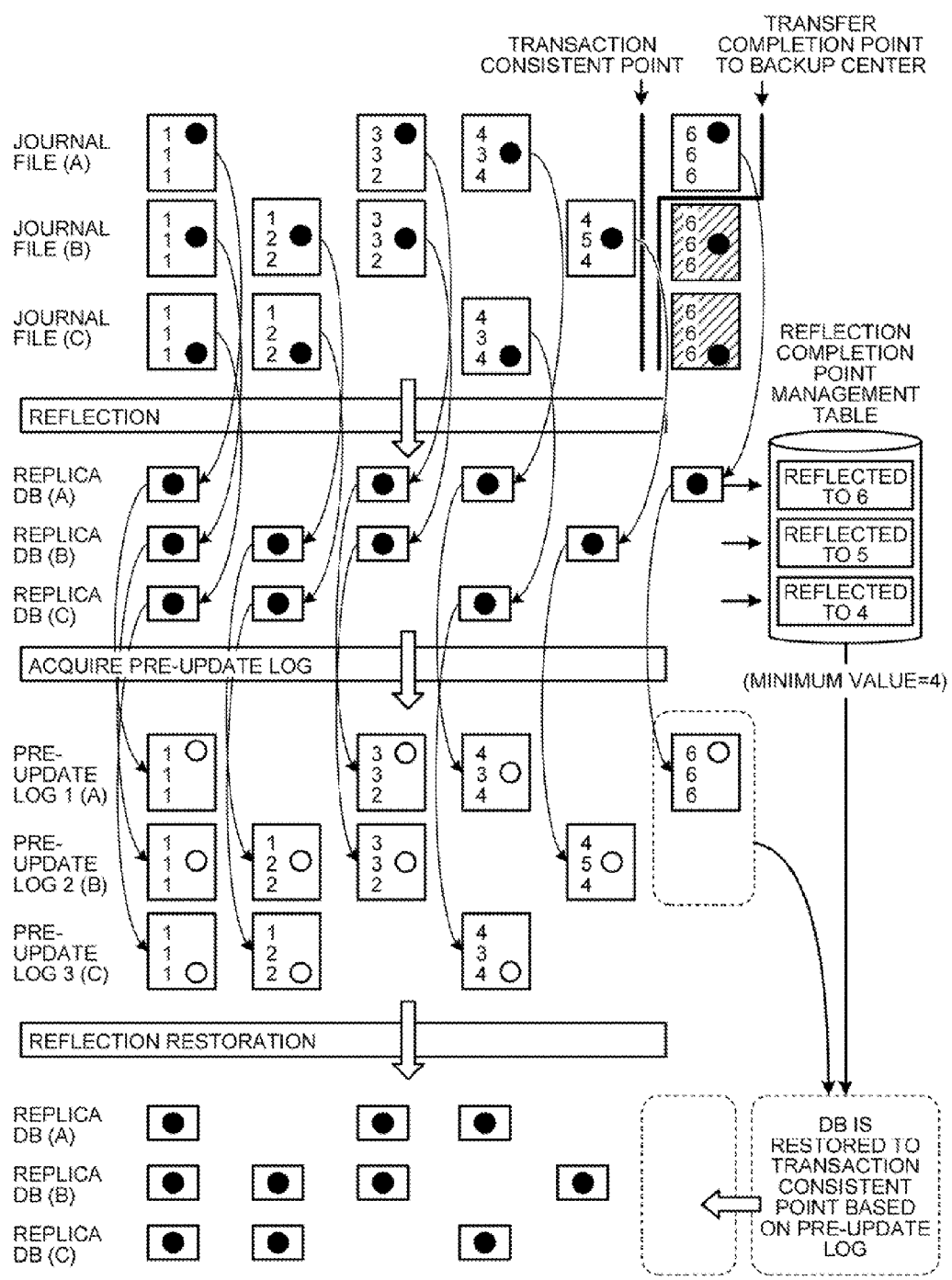
FIG. 16 is a schematic diagram illustrating a process example performed in a case in which journals for multiple replica DBs are stored in a single journal file according to a third embodiment.

FIG. 16 is a schematic diagram illustrating a process example performed in a case in which journals for multiple replica DBs are stored in a single journal file according to a third embodiment. In this example, a description will be given of a case that includes the replica DB (A), the replica DB (B), and the replica DB (C); and the replica DB (A), the replica DB (B), and the replica DB (C) include the journal file DB (A), the journal file DB (B), and the journal file DB (C), respectively.

Furthermore, in this case, it is assumed that transaction consistency information on the "journal file (A), journal file (B), and journal file (C)" is included in each journal file. Specifically, the journal acquiring unit 12d at the main center adds the transaction consistency information, such as "1, 1, and 1", to each journal.

As illustrated in FIG. 16, as a first generation journal file, the remote processing unit 22c receives three journal files, in which the transaction consistency information is "1, 1, and 1", and stores the journal files in the corresponding journal file DB. Specifically, the database management apparatus 20 receives, as a first generation journal file, a journal for each replica DB.

The reflecting unit 23 reads the journal file from each journal file DB and reflects the contents of the journal file in each replica DB. Then, the reflecting unit 23 updates the reflection completion point of each replica DB to 1. Furthermore, the pre-update log acquiring unit 24c acquires a pre-update log of each replica DB before each replica DB is updated and stores, for each replica DB, the pre-update log in the pre-update log table 21*c*.

Then, as a second generation journal file, the remote processing unit 22*c* receives two journal files, in which the transaction consistency information is "1, 2, and 2", and stores one of the journal files in the journal file DB (B) and one of the journal files in the journal file DB (C). Specifically, the database management apparatus 20 receives, as a second generation journal file, a journal for the replica DB (B) and a journal for the replica DB (C).

The reflecting unit 23 reads the journal file from the journal file DB (B) and reflects the contents of the journal file in the replica DB (B). Similarly, the reflecting unit 23 reads the journal file from the journal file DB (C) and reflects the contents of the journal file in the replica DB (C). Then, the reflecting unit 23 updates the reflection completion point of each of the replica DB (B) and the replica DB (C) to 2 and leaves the reflection completion point of the replica DB (A) unchanged as 1. Furthermore, the pre-update log acquiring unit 24*c* acquires a pre-update log of the replica DB (B) before the replica DB (B) is updated and stores the pre-update log in the pre-update log table 21*c*. Similarly, the pre-update log acquiring unit 24*c* acquires a pre-update log of the replica DB (C) before the replica DB (C) is updated and stores the pre-update log in the pre-update log table 21*c*.

Subsequently, as a third generation journal file, the remote processing unit 22*c* receives two journal files, in which the transaction consistency information is "3, 3, and 2" and stores one of the journal files in the journal file DB (A) and one of the journal files in the journal file DB (B). Accordingly, the database management apparatus 20 receives, as a third generation journal file, a journal for the replica DB (A) and a journal for the replica DB (B).

The reflecting unit 23 reads the journal file from the journal file DB (A) and reflects the contents of the journal file in the replica DB (A). Similarly, the reflecting unit 23 reads the journal file from the journal file DB (B) and the contents of the journal file in the replica DB (B). Then, the reflecting unit 23 updates the reflection completion point of each of the replica DB (A) and the replica DB (B) to 3 and leaves the reflection completion point of the replica DB (C) unchanged as 2. Furthermore, the pre-update log acquiring unit 24*c* acquires a pre-update log of the replica DB (A) before the replica DB (A) is updated and stores the pre-update log in the pre-update log table 21*c*. Similarly, the pre-update log acquiring unit 24*c* acquires a pre-update log of the replica DB (B) before the replica DB (B) is updated and stores the pre-update log in the pre-update log table 21*c*.

Subsequently, as a fourth generation journal file, the remote processing unit 22*c* receives two journal files, in which the transaction consistency information is "4, 3, and 4", and stores one of the journal files in the journal file DB (A) and one of the journal files in the journal file DB (C). Specifically, the database management apparatus 20 receives, as a fourth generation journal file, a journal for the replica DB (A) and a journal for the replica DB (C).

Then, the reflecting unit 23 reads the journal file from the journal file DB (A) and reflects the contents of the journal file in the replica DB (A). Similarly, the reflecting unit 23 reads the journal file from the journal file DB (C) and reflects the contents of the journal file in the replica DB (C). Then, the reflecting unit 23 updates the reflection completion point of each of the replica DB (A) and the replica DB (C) to 4 and leaves the reflection completion point of the replica DB (B) unchanged as 3. Furthermore, the pre-update log acquiring unit 24*c* acquires a pre-update log of the replica DB (A) before the replica DB (A) is updated and stores the pre-update log in the pre-update log table 21*c*. Similarly, the pre-update log acquiring unit 24*c* acquires a pre-update log of the replica DB (C) before the replica DB (C) is updated and stores the pre-update log in the pre-update log table 21*c*.

Subsequently, as a fifth generation journal file, the remote processing unit 22*c* receives one journal file, in which the transaction consistency information is "4, 5, and 4", and stores the journal file in the journal file DB (B). Specifically, the database management apparatus 20 receives, as a fifth generation journal file, a journal for the replica DB (B).

The reflecting unit 23 reads the journal file from the journal file DB (B) and reflects the contents of the journal file in the replica DB (B). Then, the reflecting unit 23 updates the reflection completion point of the replica DB (B) to 5 and leaves the reflection completion point of each of the replica DB (A) and the replica DB (C) unchanged as 4. Furthermore, the pre-update log acquiring unit 24*c* acquires a pre-update log of the replica DB (B) before the replica DB (B) is updated and stores the pre-update log in the pre-update log table 21*c*.

Subsequently, as a sixth generation journal file, the remote processing unit 22*c* receives one journal file, in which the transaction consistency information is "6, 6, and 6", and stores the journal file in the journal file DB (A). Specifically, the database management apparatus 20 detects a problem because only one journal file is received although three sixth generation journal files are supposed to be received.

The reflecting unit 23 reads the journal file from the journal file DB (A) and reflects the contents of the journal file in the replica DB (A). Then, the reflecting unit 23 updates the reflection completion point of the replica DB (A) to 6, leaves the reflection completion point of the replica DB (B) unchanged as 5, and leaves the reflection completion point of the replica DB (C) unchanged as 4. Furthermore, the pre-update log acquiring unit 24*c* acquires a pre-update log of the replica DB (A) before the replica DB (A) is updated and stores the pre-update log in the pre-update log table 21*c*.

Figure 17:
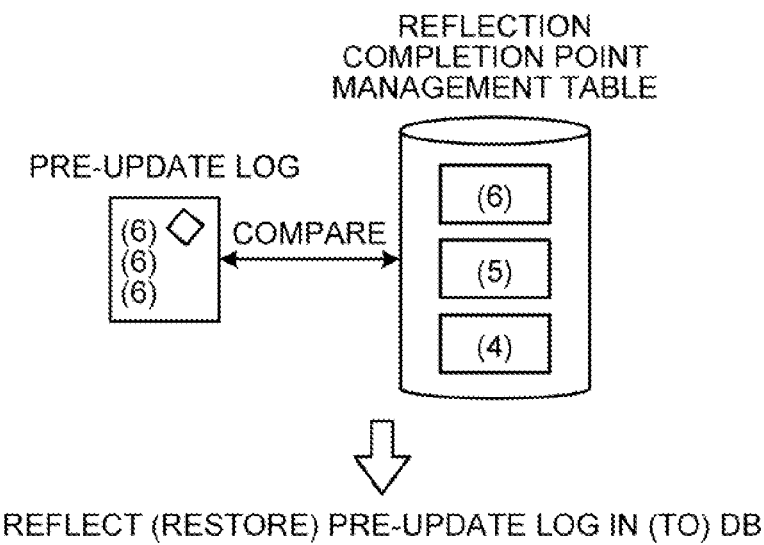
FIG. 17 is a schematic diagram illustrating determination example 1 of the reflection restoration according to the third embodiment.
Figure 18:
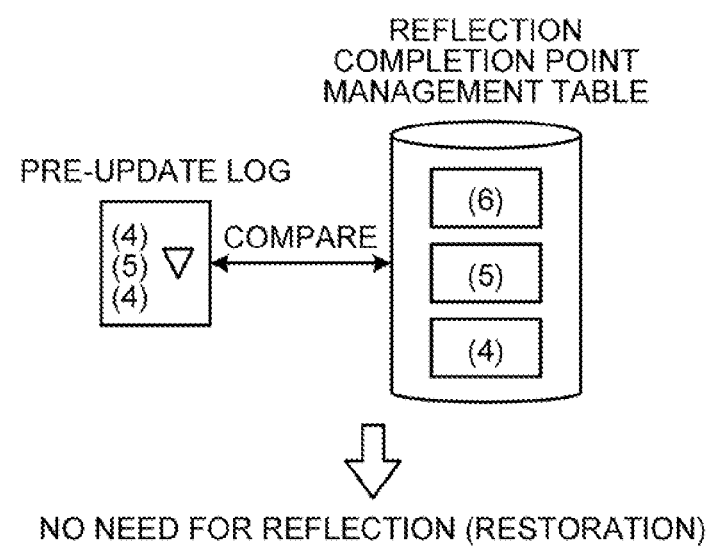
FIG. 18 is a schematic diagram illustrating determination example 2 of the reflection restoration according to the third embodiment.
Figure 19:
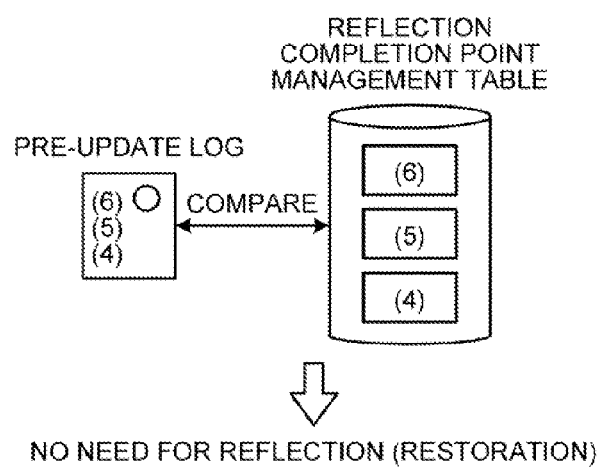
FIG. 19 is a schematic diagram illustrating determination example 3 of the reflection restoration according to the third embodiment.

Because the database management apparatus 20 detects a problem when the sixth generation journal file is received, the database management apparatus 20 performs the reflection restoration process. In the following, determination examples of the reflection restoration will be described with reference to FIGS. 17 to 19. FIG. 17 is a schematic diagram illustrating determination example 1 of the reflection restoration according to the third embodiment. FIG. 18 is a schematic diagram illustrating determination example 2 of the reflection restoration according to the third embodiment. FIG. 19 is a schematic diagram illustrating determination example 3 of the reflection restoration according to the third embodiment.

The reflection restoration execution unit 26 restores data if condition 1 and condition 2 are both satisfied: (condition 1) transaction consistency information in each of the pre-update logs has a value equal to or greater than the transaction consistency information managed by the reflection completion point management table 21*b* and (condition 2) some transaction consistency information in each of the pre-update logs does not match the transaction consistency information managed by the reflection completion point management table 21*b*.

In the following a journal file in the replica DB (A) will be described with reference to FIG. 17. In this case, for the journal file (A), the transaction consistency information in the pre-update log is "6" and the transaction consistency information in the reflection completion point management table 21*b* is "6". For the journal file (B), the transaction consistency information in the pre-update log is "6" and the transaction consistency information in the reflection completion point management table 21b is "5". For the journal file (C), the transaction consistency information in the pre-update log is "6" and the transaction consistency information in the reflection completion point management table 21b is "4".

Accordingly, the reflection restoration execution unit 26 determines that the condition 1 is satisfied because each value of the transaction consistency information in each of the pre-update logs is equal to or greater than that managed by the reflection completion point management table 21b. Furthermore, the reflection restoration execution unit 26 determines that the condition 2 is satisfied because, for the journal file (C), the transaction consistency information in the pre-update log is "6" and the transaction consistency information in the reflection completion point management table 21b is "4".

Accordingly, for the replica DB (A), the reflection restoration execution unit 26 determines that a journal is to be restored and performs the reflection restoration process. Specifically, the reflection restoration execution unit 26 restores the journal, which contains the transaction consistency information of "6, 6, and 6" and is reflected in the replica DB (A). Specifically, the reflection restoration execution unit 26 reflects, in the replica DB (A), the pre-update log containing the transaction consistency information of "6".

In the following, a journal file in the replica DB (B) will be described with reference to FIG. 18. In this case, for the journal file (A), the transaction consistency information in the pre-update log is "4" and the transaction consistency information in the reflection completion point management table 21b is "6". For the journal file (B), the transaction consistency information in the pre-update log is "5" and the transaction consistency information in the reflection completion point management table 21b is "5". For the journal file (C), the transaction consistency information in the pre-update log is "4" and the transaction consistency information in the reflection completion point management table 21b is "4".

Accordingly, the reflection restoration execution unit 26 determines that the condition 1 is not satisfied because the transaction consistency information of "4" in the journal file (A) stored in the pre-update log is less than the transaction consistency information of "6" in the journal file (A) stored in the reflection completion point management table 21b. Accordingly, the reflection restoration execution unit 26 determines that the journal has not been restored with respect to the replica DB (B).

In the following, a journal file in the replica DB (C) will be described with reference to FIG. 19. In this case, for the journal file (A), the transaction consistency information in the pre-update log is "6" and the transaction consistency information in the reflection completion point management table 21b is "6". For the journal file (B), the transaction consistency information in the pre-update log is "5" and the transaction consistency information in the reflection completion point management table 21b is "5". For the journal file (C), the transaction consistency information in the pre-update log is "4" and the transaction consistency information in the reflection completion point management table 21b is "4".

Accordingly, the reflection restoration execution unit 26 determines that the condition 1 is satisfied because each value of the transaction consistency information in each of the pre-update logs is equal to or greater than that managed by the reflection completion point management table 21b. However, the reflection restoration execution unit 26 determines that the condition 2 is not satisfied because the transaction consistency information in each of the pre-update logs matches all of the transaction consistency information managed by the reflection completion point management table 21b. Accordingly, the reflection restoration execution unit 26 determines that the journal is not restored with respect to the replica DB (C).

By doing so, in FIG. 15, the journal containing the transaction consistency information of 5 is restored. However, this journal is closed with respect to the replica DB (B). In the method described in the second embodiment, because it is not determined whether a journal is closed with respect to a corresponding replica DB, the journal is restored. However, in the third embodiment, it is possible to determine whether a journal is closed with respect to a corresponding replica DB. Accordingly, it is possible to continue the processes by updating data closer to the master DB and restoring consistent replica DBs.

[d] Fourth Embodiment

In the above explanation, a description has been given of the embodiments according to the present invention; however, the embodiments are not limited thereto and can be implemented with various kinds of embodiments other than the embodiments described above. Therefore, another embodiment will be described below.

Transaction Consistency Information

In the embodiments described above, numbers sequentially incremented are used as transaction consistency information; however, the present invention is not limited thereto. For example, an arbitrary identifier may also be used. In such a case, pre-update logs may also be stored in a time series and the reflection restoration may also be performed in accordance with the time series.

Furthermore, as the transaction consistency information, it may also be possible to use, for example, a transaction ID for identifying a transaction that updates a master DB. In such a case, a pre-update log contains therein the same transaction ID. Consequently, it is possible to specify an identifier that is not retained in databases as the target information for the reflection restoration.

System

Of the processes described in the embodiments, the whole or a part of the processes that are mentioned as being automatically performed can also be manually performed, or the whole or a part of the processes that are mentioned as being manually performed can also be automatically performed using known methods. Furthermore, the flow of the processes, the control procedures, the specific names, and the information containing various kinds of data or parameters indicated in the above specification and drawings can be arbitrarily changed unless otherwise stated. In the embodiments described above, the backup system is used as an example; however, the embodiments may also be used in an arbitrary database system.

The components of each unit illustrated in the drawings are only for conceptually illustrating the functions thereof and are not always physically configured as illustrated in the drawings. In other words, the specific shape of a separate or integrated device is not limited to the drawings. Specifically, all or part of the device can be configured by functionally or physically separating or integrating any of the units depending on various loads or use conditions. Furthermore, all or any part of the processing functions performed by each device can be implemented by a CPU and by programs analyzed and executed by the CPU or implemented as hardware by wired logic.

Hardware Configuration

The various processes described in the above embodiments can be implemented by programs prepared in advance and executed by a computer such as a personal computer or a workstation. Accordingly, in the following, an example of a computer system that executes a program having the same function performed by the apparatus in the above embodiments will be described.

Figure 20:
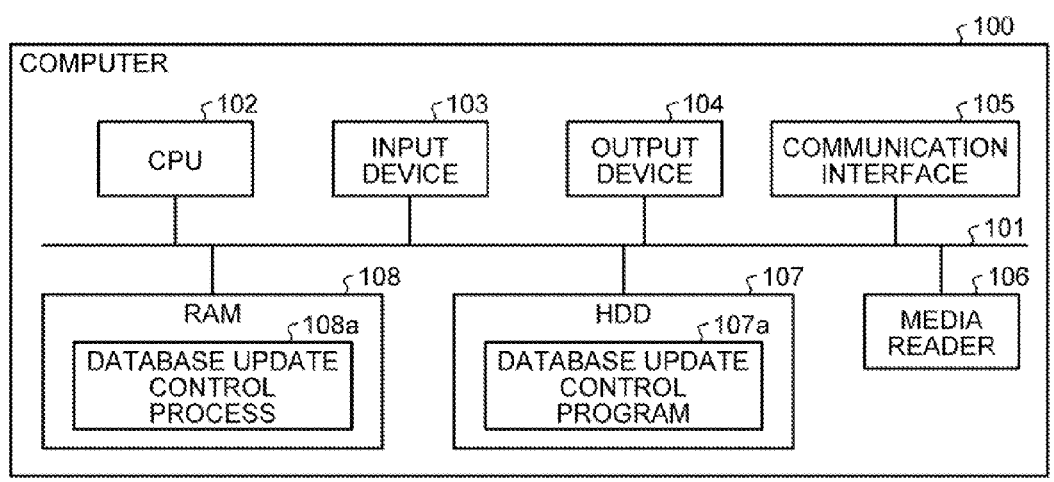
FIG. 20 is a block diagram illustrating the hardware configuration of a computer that executes a database update control program.

FIG. 20 is a block diagram illustrating the hardware configuration of a computer that executes a database update control program. As illustrated in FIG. 20, a computer 100 includes a CPU 102, an input device 103, an output device 104, a communication interface 105, a media reader 106, a hard disk drive (HDD) 107, and a random access memory (RAM) 108. Furthermore, each of the units illustrated in FIG. 20 are connected each other via a bus 101.

The input device 103 is a mouse or a keyboard; the output device 104 is, for example, a display; and the communication interface 105 is an interface, such as a network interface card (NIC). The HDD 107 stores therein, together with a database update control program 107a, the DBs or the tables illustrated in FIG. 2. The HDD 107 is mentioned as an example of a recording medium; however, the present invention is not limited thereto. For example, various programs may also be stored in another computer readable recording medium, such as a read only memory (ROM), a RAM, a CD-ROM, or a solid state drive (SSD) and may also be read by a computer. Furthermore, a program may also be obtained and used by arranging a storage medium at a remote site and by a computer accessing the storage medium. Furthermore, at this time, the obtained program may also be stored in the recording medium in the computer.

The CPU 102 reads the database update control program 107a and loads it in the RAM 108, and thus the database update control program 107a functions as a database update control process 108a that executes each function described above with reference to FIG. 5 or the like. Specifically, the database update control process 108a executes the same functions as those performed by the remote disk processing unit 22, the reflecting unit 23, the DBMS 24, the updated log acquiring unit 25, and the reflection restoration execution unit 26 illustrated in FIG. 5. Furthermore, the database update control process 108a can also execute the same functions as those performed by the DBMS 12 and the remote disk processing unit 13 illustrated in FIG. 2. In this way, by reading and executing the program, the computer 100 operates as an information processing apparatus that executes the database update control method.

The computer 100 reads the database update control program from the recording medium by the media reader 106 and executes the read database update control program, thereby implementing the same function described in the embodiments. The program mentioned in the embodiment is not limited to the program executed by the computer 100. For example, the present invention can also be used in a case in which another computer or a server executes the program or in which another computer or a server cooperatively executes the program with each other.

According to an aspect of the present invention, it is possible to reduce the time taken to reflect data in a replica DB and the time taken to resume the operation after a problem occurs.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A database update control apparatus comprising:
a memory; and
a processor coupled to the memory, wherein the processor executes a process comprising:
updating, when update information with respect to one of multiple replicated databases that are generated by replicating respective contents of multiple databases is received, the replicated database on the basis of the update information, each of the multiple replicated databases storing a replica of a corresponding one of the multiple databases, and the replica in each of the multiple replicated databases is different from each other;
retaining, in an associated manner for each replicated database and when the replicated database is updated, pre-update data and an identifier which is added to the update information;
extracting, for each replicated database from among the identifiers retained at the retaining, a first identifier indicating the latest update information and specifying, from the extracted first identifiers for the multiple replicated databases, a second identifier indicating the oldest update information; and
reflecting pre-update data associated with an identifier that is newer than the second identifier specified at the specifying in a corresponding replicated database out of the multiple replicated databases.

2. The database update control apparatus according to claim 1, wherein
the identifier is a number that is added by being incremented in transaction units by a transmission source that transmits the update information,
the retaining includes further retaining a number that indicates the latest update information for each replicated database,
the specifying includes specifying a minimum number from among numbers indicating the latest update information retained, for each replicated database, at the retaining,
the reflecting includes acquiring pre-update data associated with a number greater than the minimum number, which is retained at the retaining with respect to the replicated database and is specified at the specifying, and reflecting, for each replicated database, the pre-update data in the replicated database.

3. The database update control apparatus according to claim 1, wherein
the update information is an update file that contains, for each replicated database, update information to which a number incremented by the transmission source that transmits the update information is added, and
the updating includes updating a corresponding replicated database on the basis of update information, to which a number that is greater than the number added to previous update information is added, from the update information contained in an update file that is received.

4. The database update control apparatus according to claim 3, wherein,
the retaining includes retaining, for each update file, a pre-update log that contains the pre-update data and the number and further retaining, as a reflection completion point for each replicated database, a number added to the latest update information that updates the pre-update data , and the specifying includes specifying an update file that contains a number assigned to the pre-update log that is a value equal to or greater than numbers managed as the reflection completion point and that contains update information having a number that is assigned to the pre-update log and that does not match the numbers managed as the reflection completion point.

5. A database management system comprising:

a first database management apparatus that retains multiple databases; and a second database management apparatus that retains multiple replicated databases that are generated by replicating respective contents of the multiple databases, wherein the first database management apparatus includes a transmitting unit that transmits, when the multiple databases are updated, update information that contains updated content and an identifier for identifying the updated content to the second database management apparatus, and the second database management apparatus includes an updating unit that updates, when the update information is received from the first database management apparatus, the multiple replicated databases on the basis of the update information, each of the multiple replicated databases storing a replica of a corresponding one of the multiple databases, and the replica in each of the multiple replicated databases is different from each other, a retaining unit that retains, in an associated manner for each replicated database and when the updating unit updates the multiple replicated databases, pre-update data and an identifier that is added to the update information, a specifying unit that extracts, for each replicated database from among the identifiers retained by the retaining unit, a first identifier indicating the latest update information and that specifies, from the extracted first identifiers for the multiple replicated databases, a second identifier indicating the oldest update information, and a reflecting unit that reflects pre-update data associated with an identifier that is newer than the second identifier that the specifying unit specifies in a corresponding replicated database from among the multiple replicated databases.

6. A non-transitory computer-readable storage medium having stored therein a database update control program causing a computer to execute a process comprising:

updating, when update information with respect to one of multiple replicated databases that are generated by replicating respective contents of multiple databases is received, the replicated database on the basis of the update information, each of the multiple replicated databases storing a replica of a corresponding one of the multiple databases, and the replica in each of the multiple replicated databases is different from each other;

retaining, in an associated manner for each replicated database and when the replicated database is updated, pre-update data and an identifier that is added to the update information;

extracting, for each replicated database from among the retained identifiers, a first identifier that indicates the latest update information and specifying, from the extracted first identifiers for the multiple replicated databases, a second identifier indicating the oldest update information; and reflecting pre-update data associated with an identifier that is newer than the second identifier specified at the specifying in a corresponding replicated database out of the multiple replicated databases.

* * * * *